US012596684B2

(12) United States Patent
Shilane

(10) Patent No.: US 12,596,684 B2
(45) **Date of Patent: \*Apr. 7, 2026**

(54) SYSTEMS AND METHODS FOR SEARCHING DEDUPLICATED DATA

(71) Applicant: EMC IP Holding Company LLC, Hopkinton, MA (US)

(72) Inventor: Philip Shilane, Newtown, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 74 days.

This patent is subject to a terminal disclaimer.

(21) Appl. No.: 18/464,188

(22) Filed: Sep. 8, 2023

(65) Prior Publication Data

US 2023/0418789 A1     Dec. 28, 2023

Related U.S. Application Data

(63) Continuation of application No. 17/550,202, filed on Dec. 14, 2021, now Pat. No. 11,782,878, which is a continuation of application No. 16/878,516, filed on May 19, 2020, now Pat. No. 11,232,074.

(51) Int. Cl.
| | |
|---|---|
| *G06F 17/30* | (2006.01) |
| *G06F 16/14* | (2019.01) |
| *G06F 16/174* | (2019.01) |
| *G06F 16/22* | (2019.01) |
| *G06F 18/22* | (2023.01) |

(52) U.S. Cl.
CPC ........ *G06F 16/1748* (2019.01); *G06F 16/156* (2019.01); *G06F 16/2282* (2019.01); *G06F 18/22* (2023.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 9,116,941 | B2 * | 8/2015 | Aronovich | ............ G06F 16/955 |
| 10,452,297 | B1 * | 10/2019 | Karr | .................... H03M 7/3091 |
| 2015/0019501 | A1 * | 1/2015 | Akirav | ................ G06F 16/1752 |
| | | | | 707/692 |
| 2015/0331905 | A1 * | 11/2015 | Brand | ..................... H04L 63/20 |
| | | | | 707/770 |

(Continued)

*Primary Examiner* — Hung D Le
(74) *Attorney, Agent, or Firm* — Staniford Tomita LLP

(57) ABSTRACT

A deduplicated storage system storing objects receives a search term. Storage includes metadata and segments into which the objects have been split and deduplicated. Metadata includes fingerprint sequences according to which the segments should be assembled. A partial match is found when a prefix of the term is found at an end of a segment or a suffix is found at a beginning of the segment. The partial matches are recorded and merged to form full matches. Each full match includes a first fingerprint of a first segment in which the prefix was found and a second fingerprint of a second segment in which the suffix was found. A check is made of whether a fingerprint and a next fingerprint from a first sequence of fingerprints associated with a first object have been recorded in the database. If so, the first object is reported as having the search term.

18 Claims, 15 Drawing Sheets

(56)     References Cited

U.S. PATENT DOCUMENTS

| | | | |
|---|---|---|---|
| 2016/0092312 A1* | 3/2016 | Dornquast | G06F 11/1435 |
| | | | 707/692 |
| 2017/0161329 A1* | 6/2017 | Chambliss | G06F 16/1748 |
| 2018/0253255 A1* | 9/2018 | Jain | G06F 3/0673 |
| 2019/0026317 A1 | 1/2019 | Todd | |
| 2019/0026325 A1 | 1/2019 | Todd | |
| 2019/0034289 A1* | 1/2019 | Natanzon | G06F 16/2255 |
| 2019/0121564 A1* | 4/2019 | Guim Bernat | G06F 3/0608 |
| 2019/0377509 A1* | 12/2019 | Wu | G06F 3/0673 |
| 2020/0137109 A1* | 4/2020 | Endler | H04L 63/1425 |
| 2020/0279041 A1* | 9/2020 | Endler | G06F 21/554 |
| 2020/0279050 A1* | 9/2020 | Endler | H04L 9/002 |
| 2020/0341669 A1* | 10/2020 | Shabi | G06F 3/0673 |
| 2021/0149903 A1* | 5/2021 | Won | G06F 16/24535 |

* cited by examiner

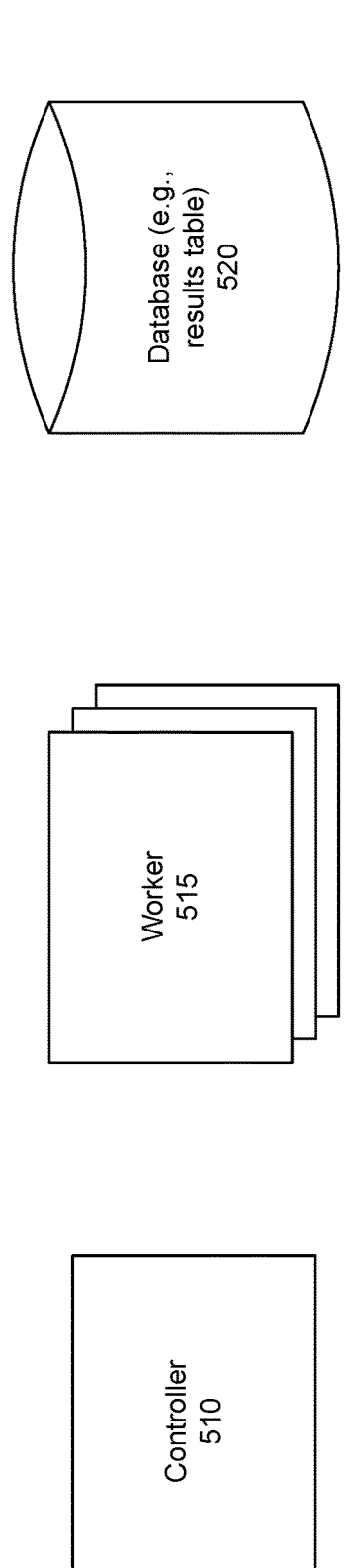
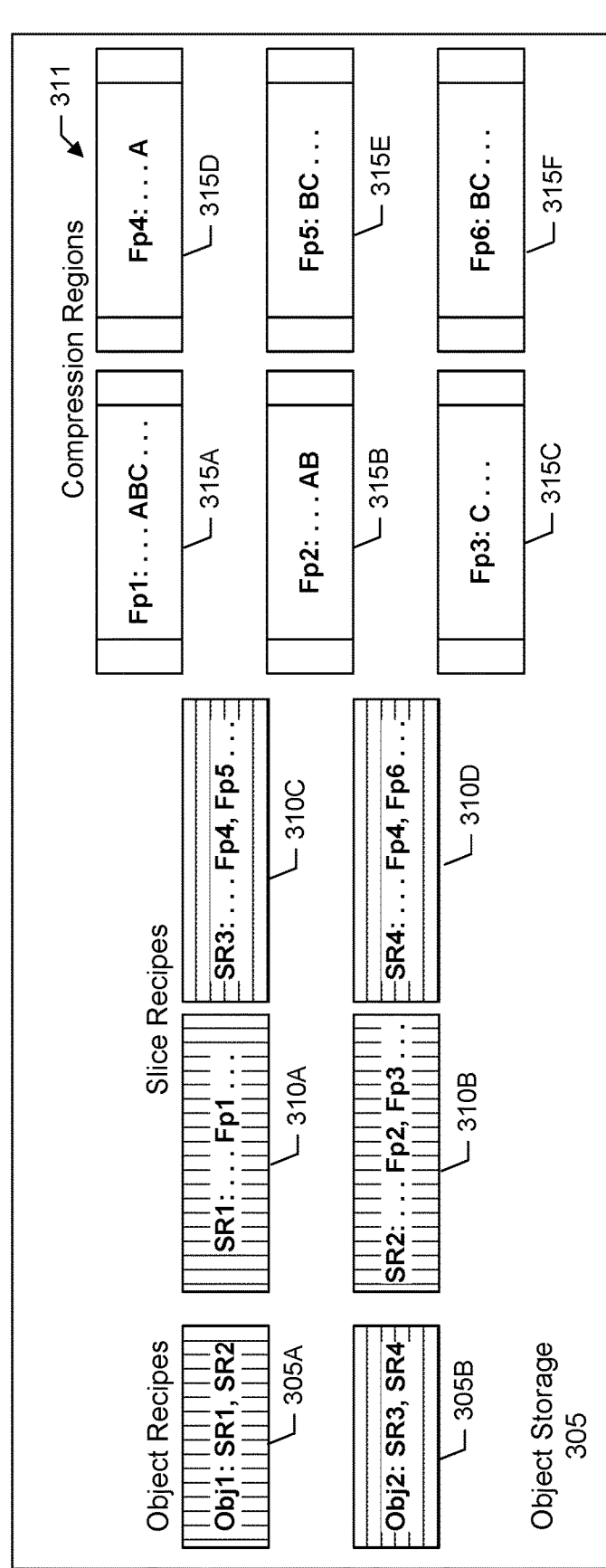
FIG. 5

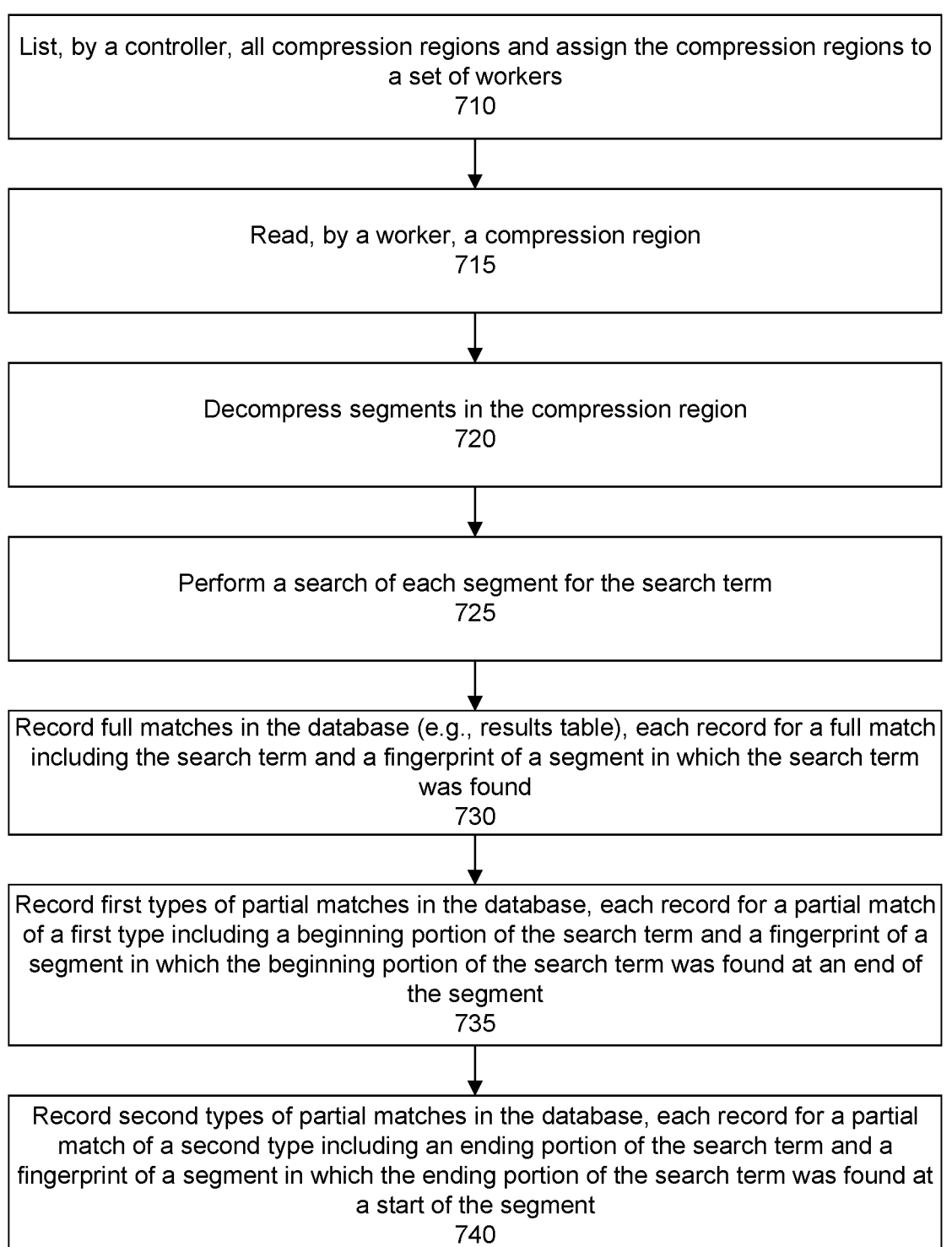

List, by a controller, all compression regions and assign the compression regions to a set of workers
710

Read, by a worker, a compression region
715

Decompress segments in the compression region
720

Perform a search of each segment for the search term
725

Record full matches in the database (e.g., results table), each record for a full match including the search term and a fingerprint of a segment in which the search term was found
730

Record first types of partial matches in the database, each record for a partial match of a first type including a beginning portion of the search term and a fingerprint of a segment in which the beginning portion of the search term was found at an end of the segment
735

Record second types of partial matches in the database, each record for a partial match of a second type including an ending portion of the search term and a fingerprint of a segment in which the ending portion of the search term was found at a start of the segment
740

FIG. 7

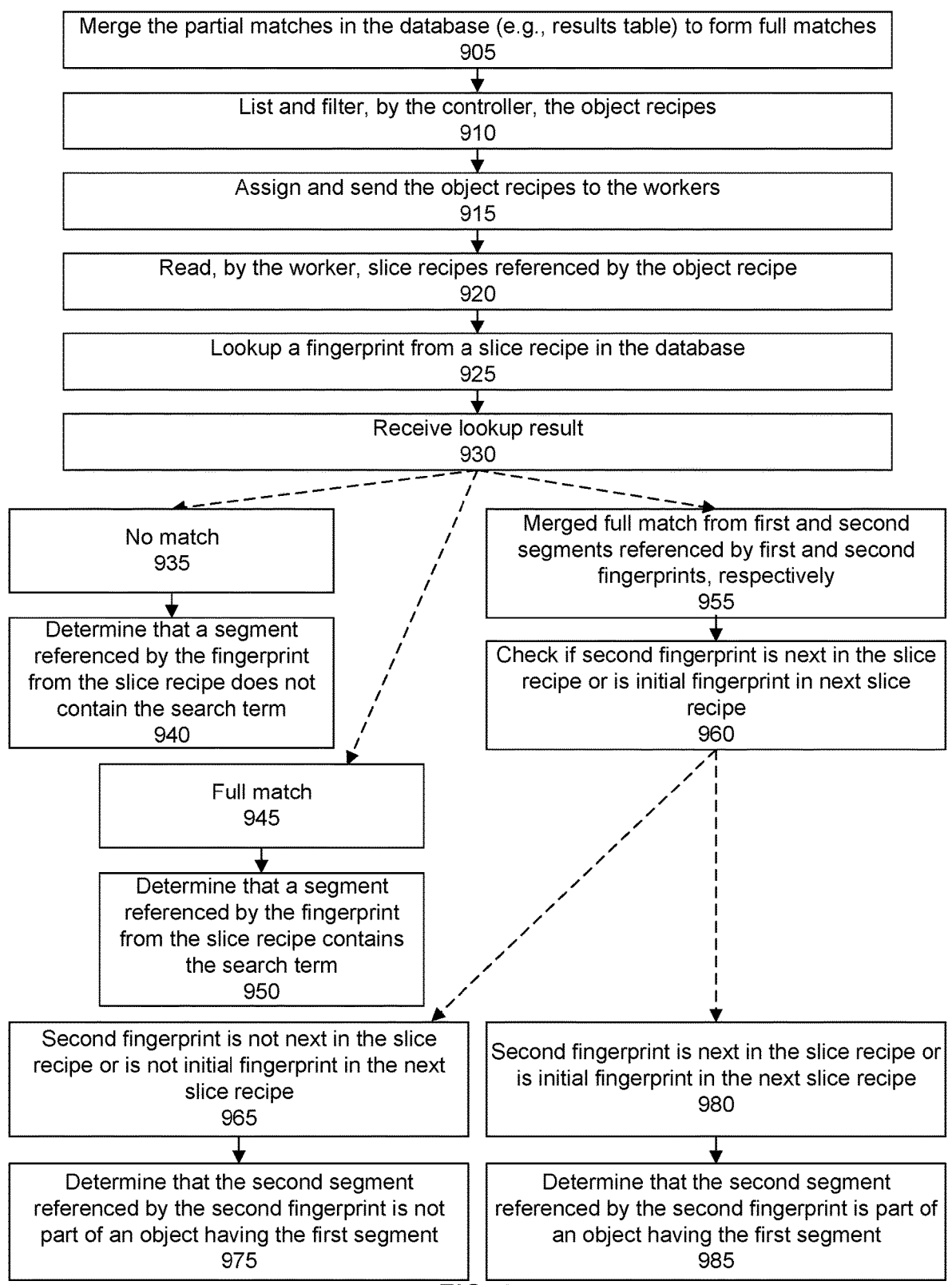

Merge the partial matches in the database (e.g., results table) to form full matches
905

List and filter, by the controller, the object recipes
910

Assign and send the object recipes to the workers
915

Read, by the worker, slice recipes referenced by the object recipe
920

Lookup a fingerprint from a slice recipe in the database
925

Receive lookup result
930

No match
935

Determine that a segment referenced by the fingerprint from the slice recipe does not contain the search term
940

Merged full match from first and second segments referenced by first and second fingerprints, respectively
955

Check if second fingerprint is next in the slice recipe or is initial fingerprint in next slice recipe
960

Full match
945

Determine that a segment referenced by the fingerprint from the slice recipe contains the search term
950

Second fingerprint is not next in the slice recipe or is not initial fingerprint in the next slice recipe
965

Second fingerprint is next in the slice recipe or is initial fingerprint in the next slice recipe
980

Determine that the second segment referenced by the second fingerprint is not part of an object having the first segment
975

Determine that the second segment referenced by the second fingerprint is part of an object having the first segment
985

FIG. 9

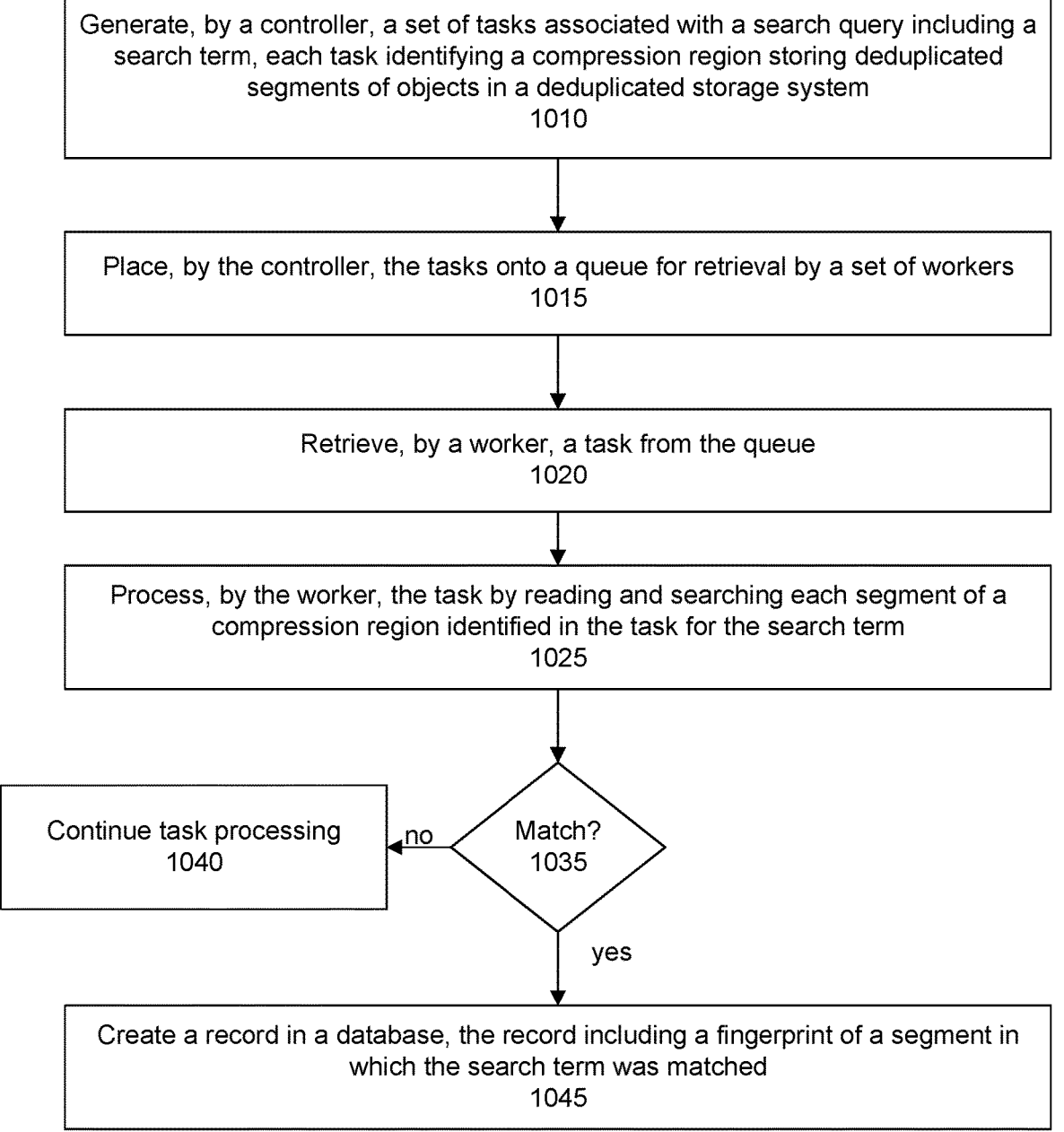

Generate, by a controller, a set of tasks associated with a search query including a search term, each task identifying a compression region storing deduplicated segments of objects in a deduplicated storage system
1010

Place, by the controller, the tasks onto a queue for retrieval by a set of workers
1015

Retrieve, by a worker, a task from the queue
1020

Process, by the worker, the task by reading and searching each segment of a compression region identified in the task for the search term
1025

Continue task processing
1040 no

Match?
1035 yes

Create a record in a database, the record including a fingerprint of a segment in which the search term was matched
1045

FIG. 10

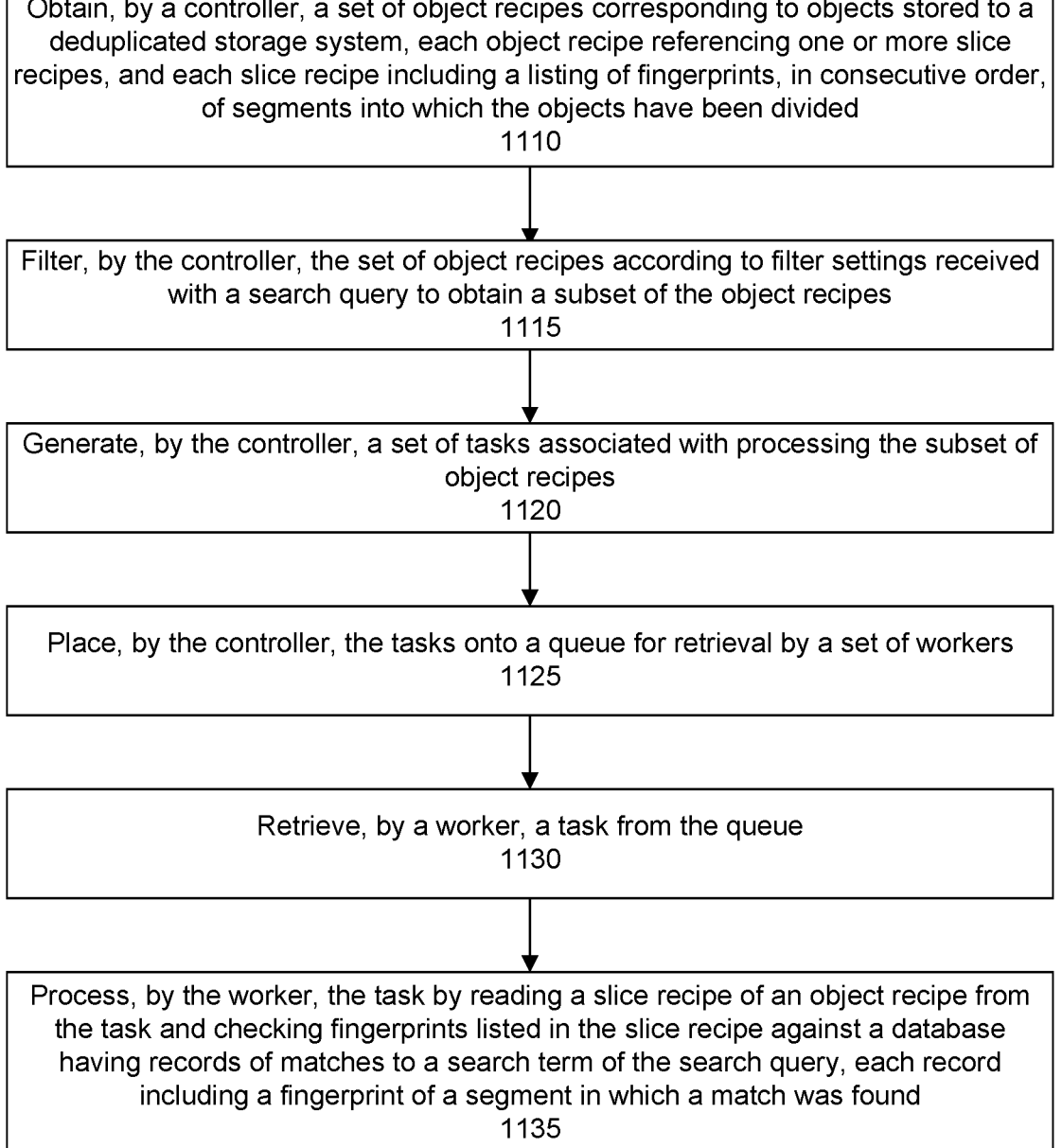

Obtain, by a controller, a set of object recipes corresponding to objects stored to a deduplicated storage system, each object recipe referencing one or more slice recipes, and each slice recipe including a listing of fingerprints, in consecutive order, of segments into which the objects have been divided
1110

Filter, by the controller, the set of object recipes according to filter settings received with a search query to obtain a subset of the object recipes
1115

Generate, by the controller, a set of tasks associated with processing the subset of object recipes
1120

Place, by the controller, the tasks onto a queue for retrieval by a set of workers
1125

Retrieve, by a worker, a task from the queue
1130

Process, by the worker, the task by reading a slice recipe of an object recipe from the task and checking fingerprints listed in the slice recipe against a database having records of matches to a search term of the search query, each record including a fingerprint of a segment in which a match was found
1135

FIG. 11

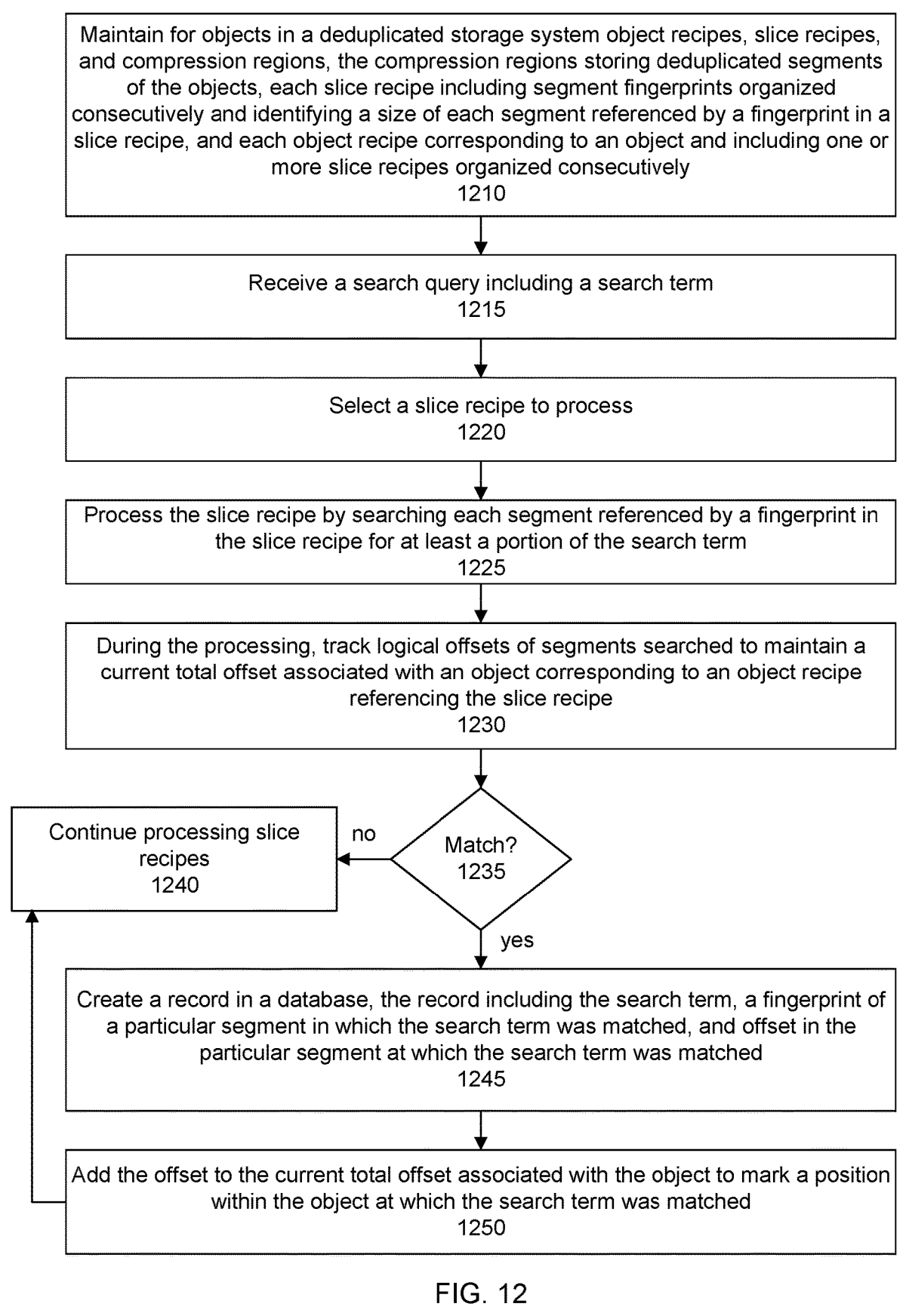

Maintain for objects in a deduplicated storage system object recipes, slice recipes, and compression regions, the compression regions storing deduplicated segments of the objects, each slice recipe including segment fingerprints organized consecutively and identifying a size of each segment referenced by a fingerprint in a slice recipe, and each object recipe corresponding to an object and including one or more slice recipes organized consecutively
1210

↓

Receive a search query including a search term
1215

↓

Select a slice recipe to process
1220

↓

Process the slice recipe by searching each segment referenced by a fingerprint in the slice recipe for at least a portion of the search term
1225

↓

During the processing, track logical offsets of segments searched to maintain a current total offset associated with an object corresponding to an object recipe referencing the slice recipe
1230

↓

Continue processing slice recipes
1240

← no ←

Match?
1235

↓ yes

Create a record in a database, the record including the search term, a fingerprint of a particular segment in which the search term was matched, and offset in the particular segment at which the search term was matched
1245

↓

Add the offset to the current total offset associated with the object to mark a position within the object at which the search term was matched
1250

FIG. 12

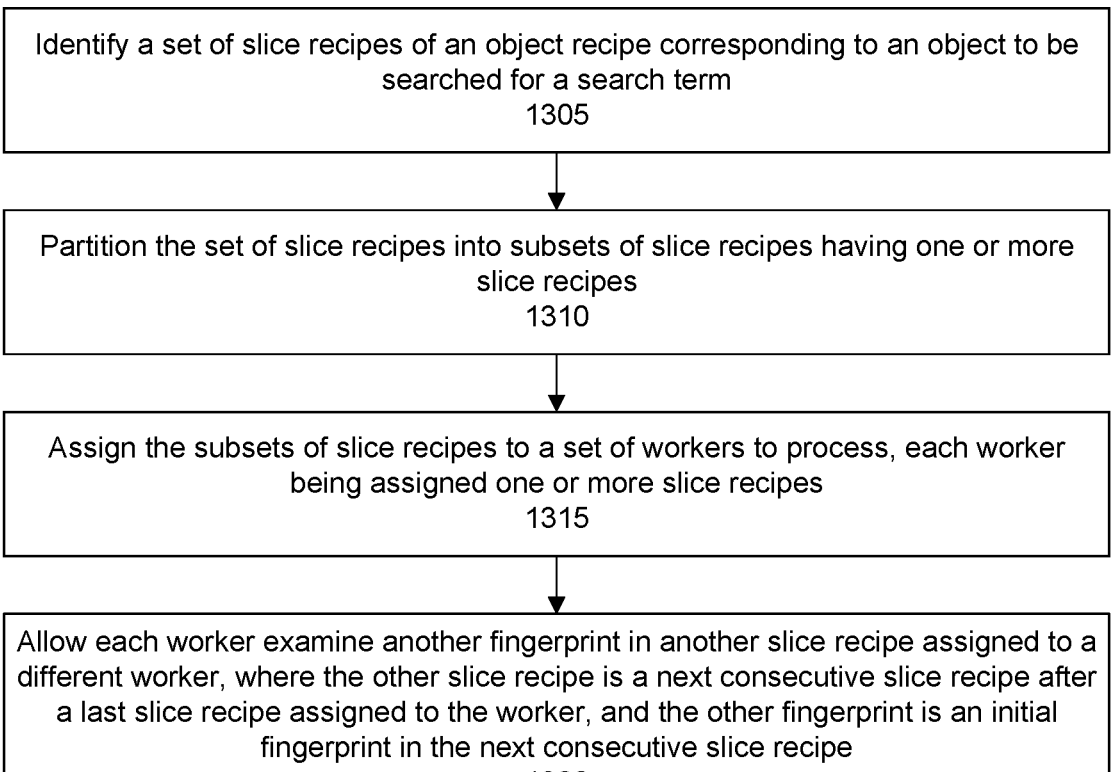

Identify a set of slice recipes of an object recipe corresponding to an object to be searched for a search term
1305

Partition the set of slice recipes into subsets of slice recipes having one or more slice recipes
1310

Assign the subsets of slice recipes to a set of workers to process, each worker being assigned one or more slice recipes
1315

Allow each worker examine another fingerprint in another slice recipe assigned to a different worker, where the other slice recipe is a next consecutive slice recipe after a last slice recipe assigned to the worker, and the other fingerprint is an initial fingerprint in the next consecutive slice recipe
1320

FIG. 13

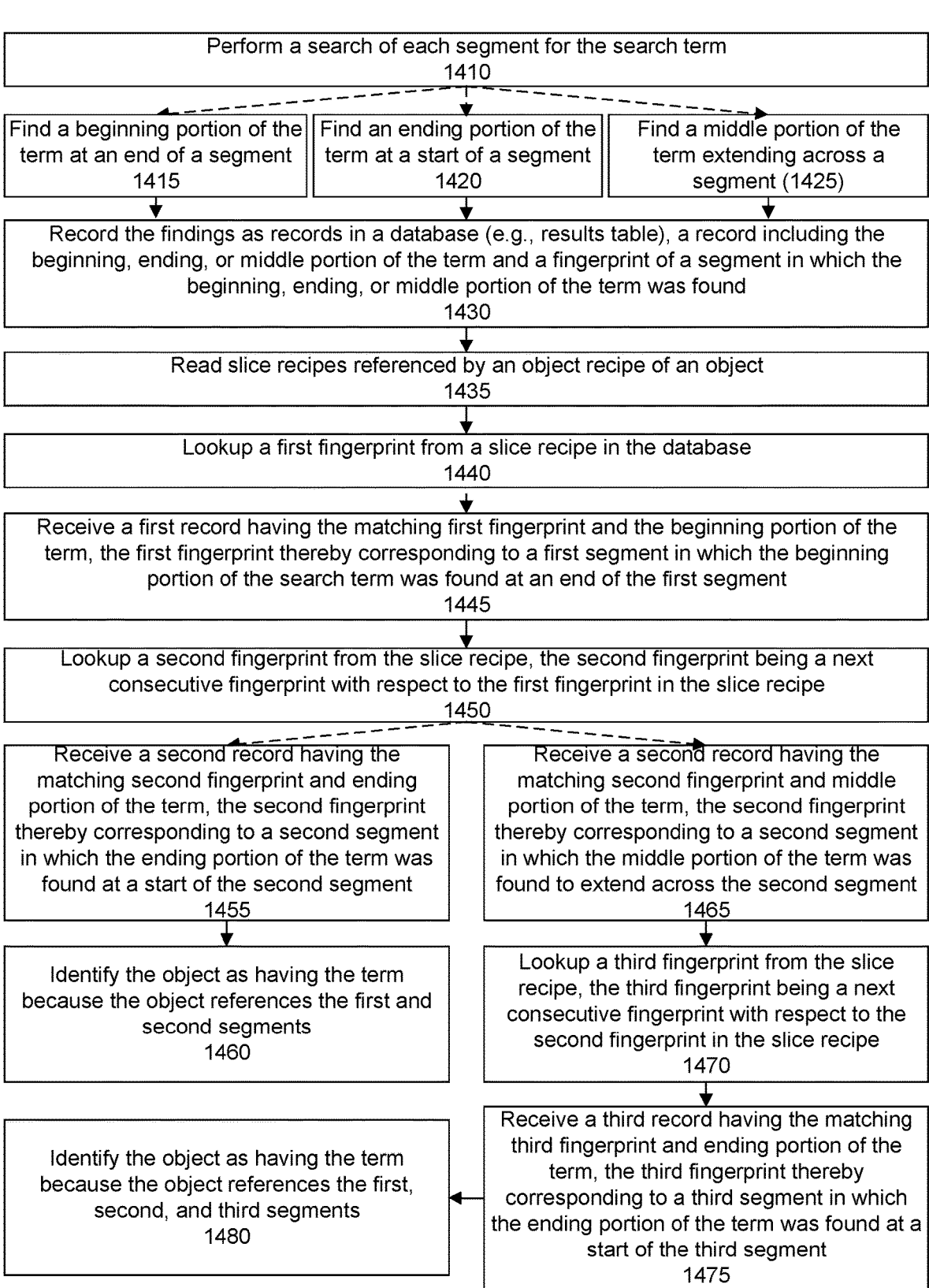

Perform a search of each segment for the search term
1410

Find a beginning portion of the term at an end of a segment
1415

Find an ending portion of the term at a start of a segment
1420

Find a middle portion of the term extending across a segment (1425)

Record the findings as records in a database (e.g., results table), a record including the beginning, ending, or middle portion of the term and a fingerprint of a segment in which the beginning, ending, or middle portion of the term was found
1430

Read slice recipes referenced by an object recipe of an object
1435

Lookup a first fingerprint from a slice recipe in the database
1440

Receive a first record having the matching first fingerprint and the beginning portion of the term, the first fingerprint thereby corresponding to a first segment in which the beginning portion of the search term was found at an end of the first segment
1445

Lookup a second fingerprint from the slice recipe, the second fingerprint being a next consecutive fingerprint with respect to the first fingerprint in the slice recipe
1450

Receive a second record having the matching second fingerprint and ending portion of the term, the second fingerprint thereby corresponding to a second segment in which the ending portion of the term was found at a start of the second segment
1455

Receive a second record having the matching second fingerprint and middle portion of the term, the second fingerprint thereby corresponding to a second segment in which the middle portion of the term was found to extend across the second segment
1465

Identify the object as having the term because the object references the first and second segments
1460

Lookup a third fingerprint from the slice recipe, the third fingerprint being a next consecutive fingerprint with respect to the second fingerprint in the slice recipe
1470

Identify the object as having the term because the object references the first, second, and third segments
1480

Receive a third record having the matching third fingerprint and ending portion of the term, the third fingerprint thereby corresponding to a third segment in which the ending portion of the term was found at a start of the third segment
1475

FIG. 14

SYSTEMS AND METHODS FOR SEARCHING DEDUPLICATED DATA

CROSS-REFERENCE TO RELATED APPLICATIONS

This application is a continuation of U.S. patent application Ser. No. 17/550,202, filed Dec. 14, 2021, which is a continuation of U.S. patent application Ser. No. 16/878,516, filed May 19, 2020, now U.S. Pat. No. 11,232,074, issued Jan. 25, 2022, and are incorporated by reference for all purposes along with all other references cited in this application.

TECHNICAL FIELD

The present invention relates generally to the field of information management, and, more particularly, to searching data in a data storage system.

BACKGROUND

Data storage refers to capturing and retaining digital information on electromagnetic, optical or silicon-based storage media. Examples of data storage devices include arrays of hard disks, flash devices, tape systems and other media types. Storage is a key component of digital devices. Consumers and businesses have come to rely on storage systems to preserve information ranging from personal photos to business-critical information. The amount of data retained for an enterprise or organization may extend well into multiple terabytes or even petabytes of data.

There are different types of data storage architectures including file storage, block storage, and object storage. Each storage architecture has its own advantages and disadvantages. Some storage systems may employ deduplication to help reduce the amount of redundant data stored. A deduplicated storage system is a type of storage system in which data content identified to be redundant (e.g., has already been stored) is not again stored. Instead, a reference to the data is created. The reference has a much smaller size than the actual data content. As a result, large savings in storage space can be realized. Deduplication, however, can incur a certain level of overhead. So, depending upon an organization's need, the type of data to be stored, and other factors, the organization may instead opt for a non-deduplicated storage system.

Nonetheless, one common thread across all these storage architectures is the need to be able to search the data and locate specific pieces of information. For example, searches may be performed for purposes of electronic discovery (e.g., identifying, collecting and producing electronically stored information (ESI) in response to a request for production in a law suit or investigation). Other examples of searching include searching for malicious byte signatures or patterns, searches in connection with machine learning and artificial intelligence, searching reference libraries such as academic journals, and so forth.

Conducting a search can require a significant amount of time and compute resources. There is a continuing demand to improve the efficiency at which a search is conducted and reduce the time required to complete a search.

A typical approach to searching a storage system, deduplicated or not, is to build an index or reverse index as data (e.g., objects) are written to the storage system. In a deduplicated storage system, this index is built on the client-written object and not the pieces that remain after deduplication. The index provides a reverse mapping from term to an object containing the term. Thus, when searching for a particular term, the index can be reviewed to identify the object containing the term.

Such an index, however, can become very large as a storage system may store many terabytes and even multiple petabytes of data. Indexing all the words in the storage system can result in an enormously large index. Further, such indexes are often limited to human-readable words or text as words are identified by spaces that appear between different words. Thus, such indexes are ill-equipped to process search terms that may include character searches or binary byte searches. There is a need for improved systems and techniques for efficiently conducting searches.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 5 shows an overall architecture of a microservice environment in which a search may be conducted in accordance with one or more embodiments.

FIG. 7 shows a flowchart of a first phase for conducting a search where full and partial matches are recorded in a results table in accordance with one or more embodiments.

FIG. 9 shows a flowchart of a second phase, according to another specific embodiment, for conducting a search where a determination is made as to which objects, if any, reference matches in the results table.

FIG. 10 shows another flowchart of conducting the first phase of the search in a microservice environment in accordance with one or more embodiments.

FIG. 11 shows another flowchart of conducting the second phase of the search in the microservice environment in accordance with one or more embodiments.

FIG. 12 shows a flowchart for reporting an offset within an object at which a search term has been found in accordance with one or more embodiments.

FIG. 13 shows a flowchart for handling searches of a large object by assigning different slice recipes of an object recipe corresponding to the object to different workers for processing in accordance with one or more embodiments.

FIG. 14 shows a flowchart for handling searches where a query happens to span more than two segments in accordance with one or more embodiments.

DETAILED DESCRIPTION

Figure 1:
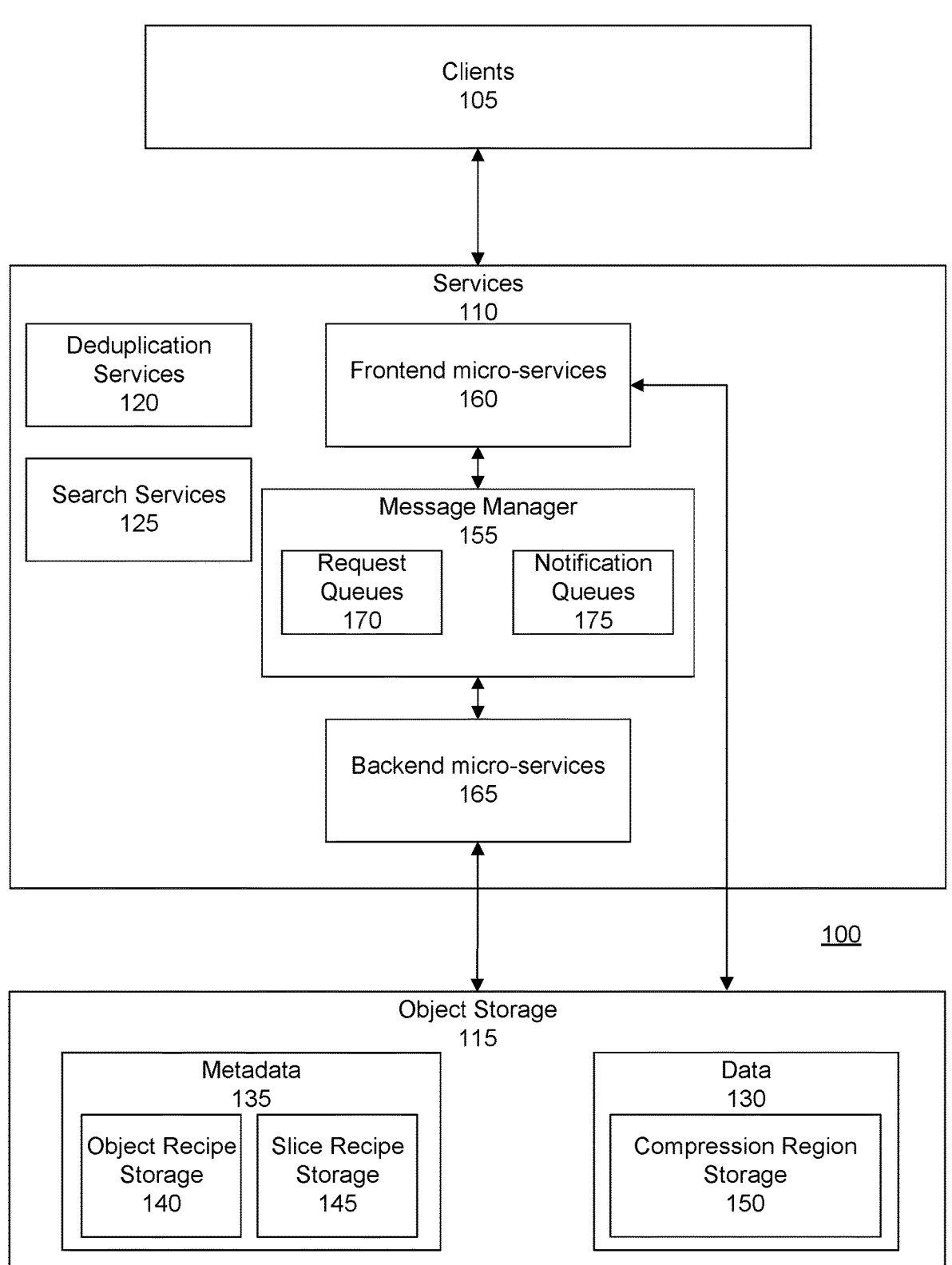
FIG. 1 shows a block diagram of a micro services architecture including a storage system having deduplication and search services in accordance with one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for performing a search across a data storage system. In a specific embodiment, the data storage system is a deduplicated data storage system and the search is conducted over deduplicated data. The search may include a character search, binary byte search, binary sequence, hash identifier, byte pattern (e.g., virus byte pattern), or text. For example, a customer user may wish to conduct a search of a particular email address, name of a person, company, phrase, and so forth.

A search, such as a text search, is a core technology that is the basis for many other storage features such as e-discovery, analytics, artificial intelligence/machine learning (AI/ML), and selecting backups to restore. While client-written data could be searched in its native format, there is an opportunity in deduplicated storage to perform the search more efficiently on the post-deduplication data. As an example, for a deduplicated storage system that achieves 20× deduplication (meaning $\frac{1}{20}$ of the space is required relative to the original data), text search may run 20× faster on the deduplicated data relative to the logical data. In a specific embodiment, systems and techniques are provided to provide searching within a microservice architecture. In this specific embodiment, a microservices architecture performs a text search on deduplicated data. Systems and techniques are also provided to handle the case of the query string being split across segment boundaries.

Text search has been explored for decades with algorithms for fast string matching. One search technique is to create an index as objects are written, which would provide a reverse mapping from term to object containing the term. Usually such indexes are built to record terms separated by white-space in the original objects. Such indexes provide quick search results, but their size can become a significant fraction of the entire storage system. In contrast, disclosed herein are systems and techniques that avoid building a large index and can handle new client-provided search terms that might not have been part of a standard indexing technique.

FIG. 1 shows a block diagram of an information processing system or computing environment 100 employing a microservices architecture in accordance with one or more embodiments of a system for searching across deduplicated data. A micro service architecture is a design pattern in which complex software systems are composed of relatively small and highly decoupled processes called "microservices." By design, a microservice provides limited functionality narrowly focused on a single task. Each microservice may be independently deployable and upgradeable. Microservices may communicate with each other using language-agnostic application programming interfaces (APIs). Some microservice architectures use inter-process communication mechanisms such as Representational State Transfer (REST) APIs or other language-agnostic APIs.

The system may include customer clients 105 accessing services 110 via a network to store their data in an object storage system 115. In a specific embodiment, the services include a deduplication service 120 and a search service 125.

The deduplication service deduplicates the data from the clients before the data is stored in object storage. Deduplication is a technique used to reduce the amount of storage space an organization needs to save its data. For example, a customer user in the organization may have created multiple similar versions of an object or may have saved the same object in different folders or locations. One example of a customer-written object is a file. Thus, there can be many copies of the same file or slightly different copies where much of the data is the same or identical. Deduplication helps to reduce the amount of redundant data that is stored by replacing the redundant data with pointers or references that point back to a single stored copy of the actual data.

The search service allows for searching the deduplicated data stored to object storage. For example, in a specific embodiment, a customer can begin by providing a search string and any filters on the search results such as date ranges, object owners, object prefix names (e.g., folder path, and so forth). The search includes a search term. The search term may include a single word, multiple words, phrases, paragraphs, multiple pages of text, one or more characters, byte sequences, or combinations of these. The customer can specify whether to perform the search immediately or as part of an offline process that runs periodically.

Figure 2:
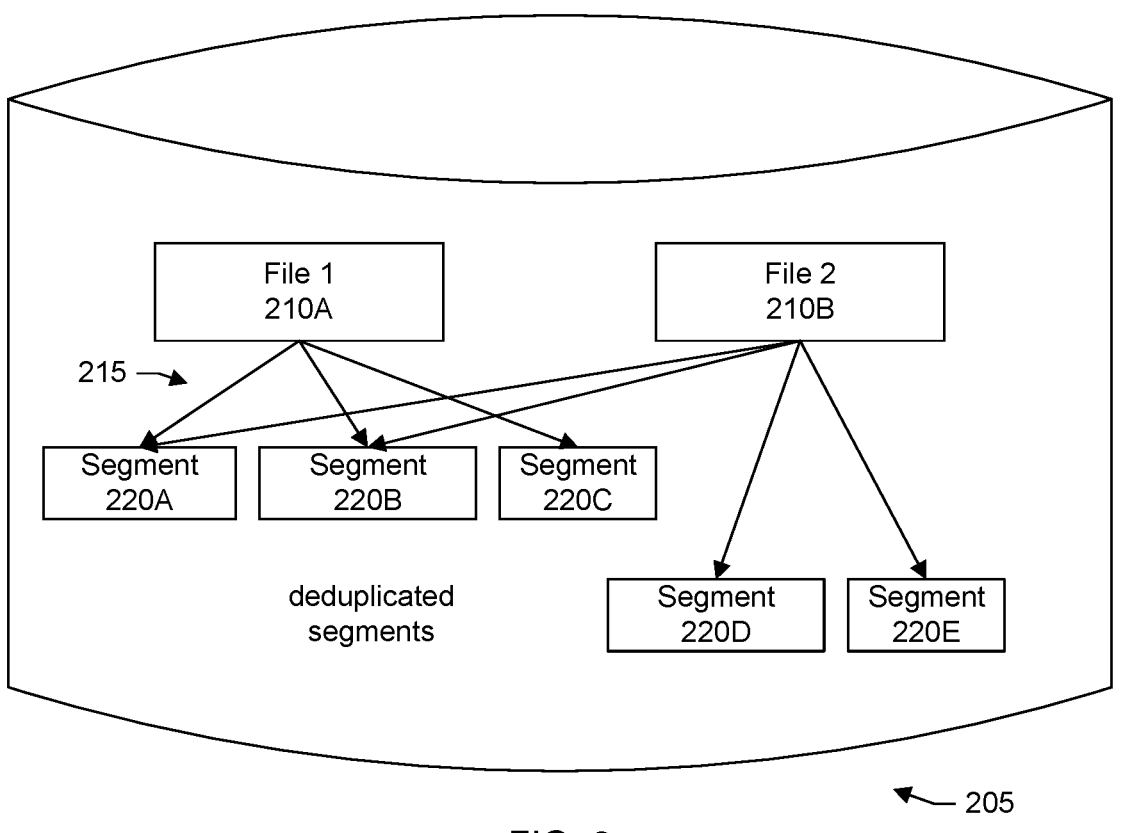
FIG. 2 shows an example of storing data in a deduplicated storage system in accordance with one or more embodiments.

FIG. 2 shows block diagram of storing data in a deduplicated storage system 205. In the example shown in FIG. 2, first and second files 210A and 210B, respectively, represent customer-written objects that the customer has written to the storage system. The files are logical representations and include pointers or references 215 to one or more actual data segments 220A-E that make up the actual file. For example, the first file includes segments 220A-C. The second file includes segments 220D-C and also segments 220A-B. Rather than storing duplicate copies of segments 220A-B, however, references are instead created for the second file that point to existing segments 220A-B.

In a specific embodiment, systems and techniques are provided for performing a search of deduplicated data without having to construct a reverse index and where a segment may be read a single time rather than multiple times. For example, reading back the logical files (e.g., first and second files) and applying matching algorithms may involve reading certain segments multiple times. In particular, reading back the first file may include reading segments 220A-C. Reading back the second file may include reading back segments 220D-E, and another read of segments 220A-B because these segments are also referred to by the second file. These repeated reads can extend the time required to execute the search query. Having multiple workers reading the logical files in parallel and searching for matches can reduce the time, but can increase the cost of the search. Adding more parallel searches may reach a performance limit as resources become fully utilized (e.g., bandwidth, I/O, or network capabilities). The times and costs can be significant as there can be many terabytes and even petabytes of data to search.

Constructing a reverse index from term to file has drawbacks. The index size can become very large because of the vast amount of data that is stored. Further, reverse indexes often assume delimited terms (such as white space), which does not support arbitrary byte sequence queries.

Referring back now to FIG. 1, object storage is a data storage architecture that manages data as objects. Each object of the object storage may include data and metadata including a globally unique identifier of the object. In one or more embodiments, the object storage may be provided by a third party cloud services provider using a web service or programmatic interface. Examples of object storage or cloud providers include Amazon Simple Storage Service (S3) as offered by Amazon Web Services (AWS) and owned by Amazon of Seattle, Washington; and Microsoft Azure as provided by Microsoft Corporation of Redmond, Washington.

In a specific embodiment, the object storage stores data 130 and metadata 135. The data includes actual customer content. An example of customer data include backups such as backups of email databases and servers, laptops, and virtual machines. These units of data may be written to the object storage directly as objects, such as through a programmatic object storage interface, or as files from a file system which are then stored as objects in the object storage. When the customer client writes data (e.g., object, file, or other unit of data) to the object storage, the data is deduplicated and metadata may be generated and stored to help track and organize the deduplicated data and facilitate its reconstruction.

Metadata includes descriptive information about the object the customer wrote to storage. The metadata may include, for example, references and pointers to various pieces of the data, and sequence information indicating an order according to which a particular customer-written object (e.g., file) is to be reconstructed. Other examples of metadata include user-assigned object or file names, folder names, directories, or paths, object or file sizes, object or file owners, access permissions, creation and last modification dates, user-assigned labels, object identification type (e.g., email, videos, photographs, audio files, or virtual machine (VM) images), associated client application name, or other information or context information that may be associated with the data content.

In a specific embodiment, the object storage includes several data structures including object recipes 140, slice recipes 145, and compression regions 150 that may be stored persistently. These structures are generated by the microservice and are stored or written to the object storage. In a specific embodiment, when a client writes an object, such as a file, to the microservice, the microservice performs a deduplication and generates a number of pieces of data and metadata that are stored in object storage. Such pieces include the object recipes, slice recipes, and compression regions. These structures facilitate the overall management and organization of the customer-written objects including processes for search, replication, deduplication, retrieval, and parallelism. For example, an object can be split so that different portions of the object may be deduplicated in parallel with each other. This can be especially beneficial in cases where the object is very large.

In particular, when a customer's object is written to the microservice via the client, the object is segmented, split, or divided into one or more segments. A fingerprint is computed for each segment. Thus, a fingerprint maps to a segment. Lists of fingerprints are organized into slice recipes. Specifically, a slice recipe may include an array of fingerprints and sizes of segments that are associated with the fingerprints in the array. In another specific embodiment, the fingerprints may be arranged or organized into a tree structure. The tree may be referred to as a segment tree and slice recipes may be referred to as LP segments.

In a specific embodiment, a customer-written object is represented by a top-level structure called an object recipe.

Thus, in this specific embodiment, the object recipe maps directly to the customer-written object (e.g., forms a one-to-one relationship to the customer-written object). The object recipe references a sequence of slice recipes, where a slice recipe includes segment references, e.g., fingerprints. In this specific embodiment, segments are approximately 8 kilobytes (KB) in size, and segment boundaries are formed in a content-defined manner that achieves high deduplication. In this specific embodiment, slice recipes span approximately 8 megabytes (MB) of segments, and slice recipes are also selected in content-defined manner. Unique segments (those that are deemed not be duplicates) are packed together up to a threshold size, compressed, and stored as compression regions.

These data structures such as object recipes facilitate the management of data as represented by objects. In a specific embodiment, each object has a corresponding object recipe. The object recipe may be identified based on the name given to an object by the customer or user. In a specific embodiment, a name of the object recipe is generated by obtaining a name of an object (as provided by the user) and concatenating, augmenting, or tagging the object name with additional metadata or tags to form the name of the object recipe.

For example, in a specific embodiment, a prefix (e.g., "obj") may be prepended to the object name to identify the associated unit of data as being an object. A timestamp may be appended as a suffix to identify the date and time that the object was written to object storage. Other reserved symbols may instead or additionally be added to form the name of the object recipe.

For example, an object named "Object A" by the user may have a corresponding object recipe named "obj##Object A##Time 5." In this example, the hash marks are reserved symbols that help to separate the parts of the string. In other words, the user-generated name is "Object A" and hash marks (e.g., "##") are used as a reserved symbol that is concatenated onto the user-generated name, followed by a timestamp. In this example, the microservice system does not allow user-generated names to include hash marks "##."

It should be appreciated that the hash mark is merely an example of a reserved symbol. Different symbols or combinations of other symbols may instead or additionally be used such as question marks (e.g., "??"), exclamation points (e.g., "!!"), and so forth. An object recipe name may instead or additionally include other metadata, identifiers, tags, and the like. For example, the object recipe name may include an identifier (e.g., unique domain identifier) of the user or customer to which the object belongs, bucket identifier, and so forth.

Figure 3:
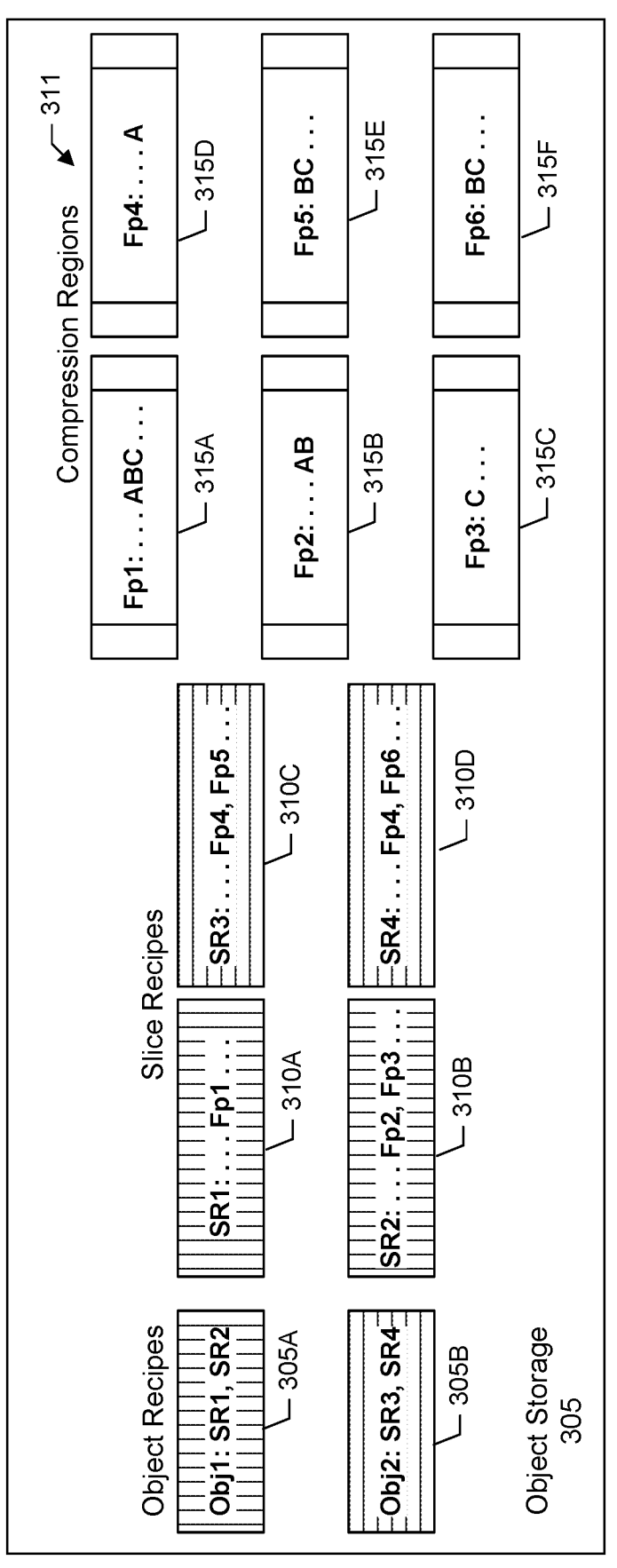
FIG. 3 shows a block diagram of data and data structures that may be found in object storage of a deduplicated storage system in accordance with one or more embodiments.

FIG. 3 shows an example of an object storage 305 storing first and second object recipes 305A-B, first, second, third, and fourth slice recipes 310A-D, and compression regions 311 storing first, second, third, fourth, fifth, and sixth segments 315A-F along with their corresponding fingerprints (e.g., Fp1-Fp6). The segments are the actual bytes, data, or content from the original customer objects or files that the customer wrote to the storage system. In this example, there are two object recipes (Obj1 305A and Obj2 305B) that each reference two slice recipes (SR) having fill patterns to match their object recipes.

In particular, the first object recipe references first and second slice recipes SR1 and SR2, respectively. These recipes are shown using a fill pattern of vertical lines to indicate an association or correspondence to the first object recipe. The second object recipe references third and fourth slice recipes SR3 and SR4, respectively. These recipes are shown using a fill pattern of horizontal lines to indicate an association or correspondence to the second object recipe.

For purposes of clarity, slice recipes are shown in an abbreviated form showing fingerprints (Fp) for some of the segments needed to reconstruct each slice. In a specific embodiment, slice recipes also include the segment size and offset of the data within the object. For each compression region, only a single fingerprint and a few characters of a segment are shown, though a compression region may have one thousand or more segments. In other words, a segment may include many bytes where, depending upon the search term, only a portion of the bytes will match the search term.

More particularly, in the example shown in FIG. 3, the first slice recipe SR1 includes a beginning ellipses, followed by a first fingerprint (Fp1) of a first segment 315A, followed by an ending ellipses.

The second slice recipe SR2 shows second and third fingerprints (Fp2,Fp3) next to each other. In particular, the second slice recipe includes a beginning ellipses, followed by second fingerprint (Fp2) of a second segment 315B, immediately followed by third fingerprint (Fp3) of a third segment 315C, followed by an ending ellipses.

The third slice recipe SR3 shows fourth and fifth fingerprints (Fp4,Fp5) next to each other. In particular, the third slice recipe includes a beginning ellipses, followed by fourth fingerprint (Fp4) of a fourth segment 315D, immediately followed by fifth fingerprint (Fp5) of a fifth segment 315E, followed by an ending ellipses.

The fourth slice SR4 recipe shows fourth and sixth fingerprints (Fp4,Fp6) next to each other. In particular, the fourth slice recipe includes a beginning ellipses, followed by fourth fingerprint (Fp4) of the fourth segment 315D, immediately followed by sixth fingerprint (Fp6) of a sixth segment 315F, followed by an ending ellipses. The ellipses shown in the slice recipes indicate other fingerprints that may be listed or included in a slice recipe.

The fingerprint listings in the slice recipes indicate sequences according to which the segments should be reconstructed. For example, a fingerprint sequence listing of the second slice recipe shows Fp2, immediately followed by Fp3, thereby indicating that an order for reconstructing the second and third segments is the second segment immediately followed by the third segment.

In other words, according to FIG. 3, the first object recipe references the first and second slice recipes. The first slice recipe lists Fp1. Thus, the first object references the first segment. The second slice recipe lists Fp2 immediately followed by Fp3. Thus, the first object also references the second and third segments. A sequence fingerprint listing of the second slice recipe indicates that when reconstructing the first object, the second segment is immediately before the third segment. The third segment is immediately after the second segment.

As another example, a fingerprint sequence listing of the third slice recipe shows Fp4, immediately followed by Fp5, thereby indicating that an order for reconstructing the fourth and fifth segments is the fourth segment immediately followed by the fifth segment.

In other words, according to FIG. 3, the second object recipe references the third and fourth slice recipes. The third slice recipe lists Fp4 immediately followed by Fp5. Thus, the second object references the fourth and fifth segments. A sequence fingerprint listing of the third slice recipe indicates that when reconstructing the second object, the fourth segment is immediately before the fifth segment. The fifth segment is immediately after the fourth segment.

The fourth slice recipe lists Fp4 immediately followed by Fp6. Thus, the second object also references the fourth and sixth segments. A sequence fingerprint listing of the fourth slice recipe indicates that when reconstructing the second object, the fourth segment is immediately before the sixth segment. The sixth segment is immediately after the fourth segment.

Referring back now to FIG. 1, when for example, a client customer issues through frontend services 160 a request to list their objects stored in the object storage, a corresponding command or query may be generated and issued to the underlying object storage system. The query may be formatted with or include, for example, criteria such as a first tag (e.g., "obj") indicating that objects are to be returned, a second tag identifying the name of the object to return (e.g., "object A"), or any other criteria, keywords, or search directives. In turn, the underlying object storage system may respond with a listing of object recipe names matching the query. However, prior to returning the results to the client customer, the object recipe names may be processed to remove any system generated or internally generated tags or metadata such as prefixes (e.g., "obj"), string separators (e.g., "##"), timestamps (e.g., "Time 5"), and the like.

Message manager 155 may facilitate transmission of requests and notifications between the frontend micro-services 160 and the backend micro-services 165. In one or more embodiments, the message manager may be a service executing on a cloud platform. The message manager may include request queues 170 and notification queues 175. A request queue may be referred to as a task queue. A notification queue may be referred to as a task status update messages queue.

Figure 4:
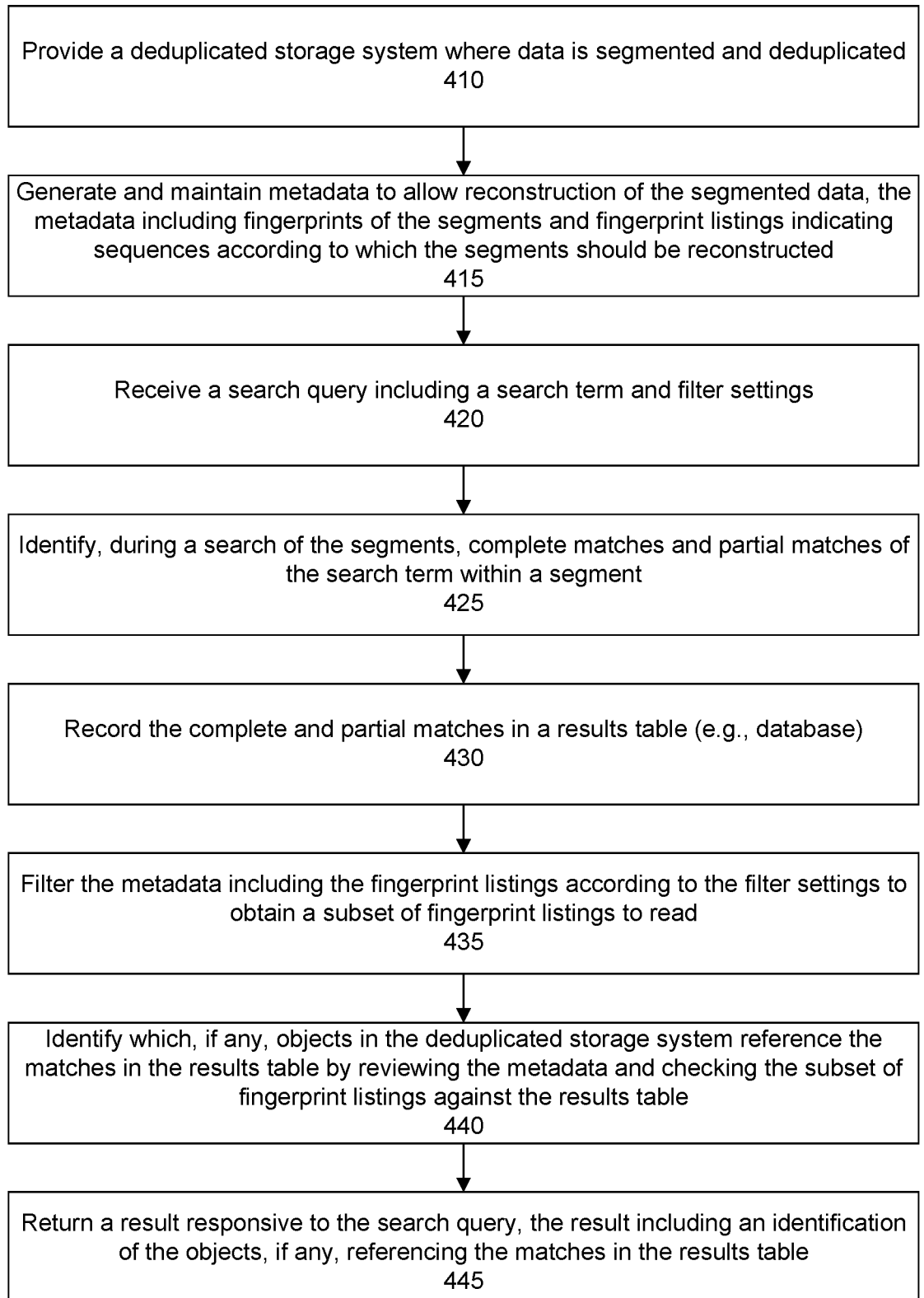
FIG. 4 shows an overall flowchart for conducting searches across deduplicated data in accordance with one or more embodiments.

FIG. 4 shows an overall flow for searching across deduplicated data. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, a deduplicated storage system is provided in which data is segmented and deduplicated. The deduplication may include applying a hash function to a segment to generate a fingerprint, signature, or hash key that identifies the segment. An example of a hash function includes the Secure Hash Algorithm 1 (SHA-1) hash function. The fingerprint may be compared to a fingerprint index maintained by the deduplicated storage system. The fingerprint index stores fingerprints of segments already existing at the deduplicated storage system. A matching fingerprint indicates that segment already exists at the storage system and does not need to be again stored. A non-matching fingerprint indicates that the segment is new or does not already exist and should be stored at the storage system.

In a step 415, metadata is generated and maintained to allow reconstruction of the segmented data. In a specific embodiment, the metadata includes fingerprints of the segments and fingerprint listings indicating sequences according to which the segments should be reconstructed.

In a step 420, a search query including a search term and optional filter settings or filter criteria is received at the deduplicated storage system. In a specific embodiment, the customer provides one or more search strings (character or byte sequences). Filters can be set for date ranges, file owners, folders (e.g., client source folder name or path), user-assigned labels or filenames, and other context information, and the like. Immediate or offline search is supported.

In a step 425, a search is performed of the segments for the search term. The search may include reading each segment to attempt to find the search term. In a specific embodiment, the search includes identifying full or complete matches and partial matches of the search term within a segment. In a specific embodiment, a partial match occurs when a beginning portion of the search term is found at an end of a segment, when an ending portion of the search term is found at a start of a segment, or when a middle or intermediate portion of the search term is found to extend across a segment. The middle or intermediate portion of the search term may be any portion of the search term between an initial character of the search term and a last character of the search term. In other words, the middle or intermediate portion of the search term may not necessarily be equidistant between the initial and last characters of the search term.

In a step 430, complete and partial matches are recorded as records in a results table such as in a database or other competent data structure. In other words, the results table is built, created, or constructed after a search query is received. A record for a match may include the search term and a fingerprint of a segment in which the search term was found. A record for a match may include the beginning portion of the search term and a fingerprint of a segment in which the beginning portion of the search term was found at the end of the segment. A record for a match may include the ending portion of the search term and a fingerprint of a segment in which the ending portion of the search term was found at a start of the segment. A record for a match may include the middle portion of the search term and a fingerprint of a segment in which the middle portion of the search was found to extend across the segment. The records may additionally include an offset or byte offset at which the search term or portion of the search term is located in the segment. Thus, in an embodiment, the results table stores records of matches associated with a particular search term; and other terms, content, text, or words that may be stored in other segments of the storage system and not associated with the particular search term are excluded, omitted, or not stored in the results table.

In a step 435, the metadata including the fingerprint listings is filtered according to the filter settings to obtain a subset of fingerprint listings to read. Filter settings or criteria may include, for example, a particular object or file creation date range (e.g., Oct. 7, 2009 to Feb. 2, 2013) that the customer is interested in. The metadata can be filtered according to the particular creation date range so that objects having metadata specifying a creation date outside the particular creation date range are removed from further consideration. The filtering can eliminate objects whose associated metadata does not satisfy the customer user supplied filter settings or criteria.

In this specific embodiment, it is noted that the filter criteria is applied to the objects that reference the segments and not to the segments themselves. As an example, if there is a date range for the query, that applies to when the object was written or last accessed by the customer, but that object may reference a segment written before the date range as a result of deduplication. Folder path applies to an object not to a segment. In another specific embodiment, depending on the system, some criteria can apply to the segments. For example, in a multi-tenant system where objects can only be deduplicated against segments from the same tenant, the processing of segments from other tenants may be skipped since they cannot be referenced from relevant objects.

In a step 440, once or after the filter settings have been applied, identifications are made of remaining objects, if any, in the deduplicated storage system that reference the matches in the results table (e.g., database). The results table or database may have recorded matches in which at least a portion of the search term was found in a segment. However, a current object may or may not reference the segment. This could occur for any number of reasons. For example, it may be possible for there to be some segments in object storage that are not referenced by any objects because a garbage collection algorithm has yet to clean up and remove such segments. As another example, at least some of the recorded segment matches may have been referenced by objects that are not part of the query because of the filtering that the customer has set.

The object identifications may be performed by reviewing the metadata and checking the subset of fingerprint listings against the results table. The actual content of the segments themselves, however, are not re-read. In some cases, reviewing the metadata and checking the fingerprints against the results table can be accomplished much faster as compared to repeatedly reading or re-reading the segments because there is much less data to process.

In a step 445, a result is returned responsive to the search query. The result may include an identification of the objects, if any, referencing matches in the results table. The result may include offsets identifying locations in the objects where the search term was found.

FIG. 5 shows an overall architecture of a microservice environment for searching across deduplicated data according to one or more embodiments. The architecture includes object storage 305, a controller 510, a set of workers 515, and a database or results table 520. The controller and workers can include executable code components, modules, processes, or services executing within the microservice environment. For example, a controller or worker microservice may run within a container hosted by a node host.

Figure 6:
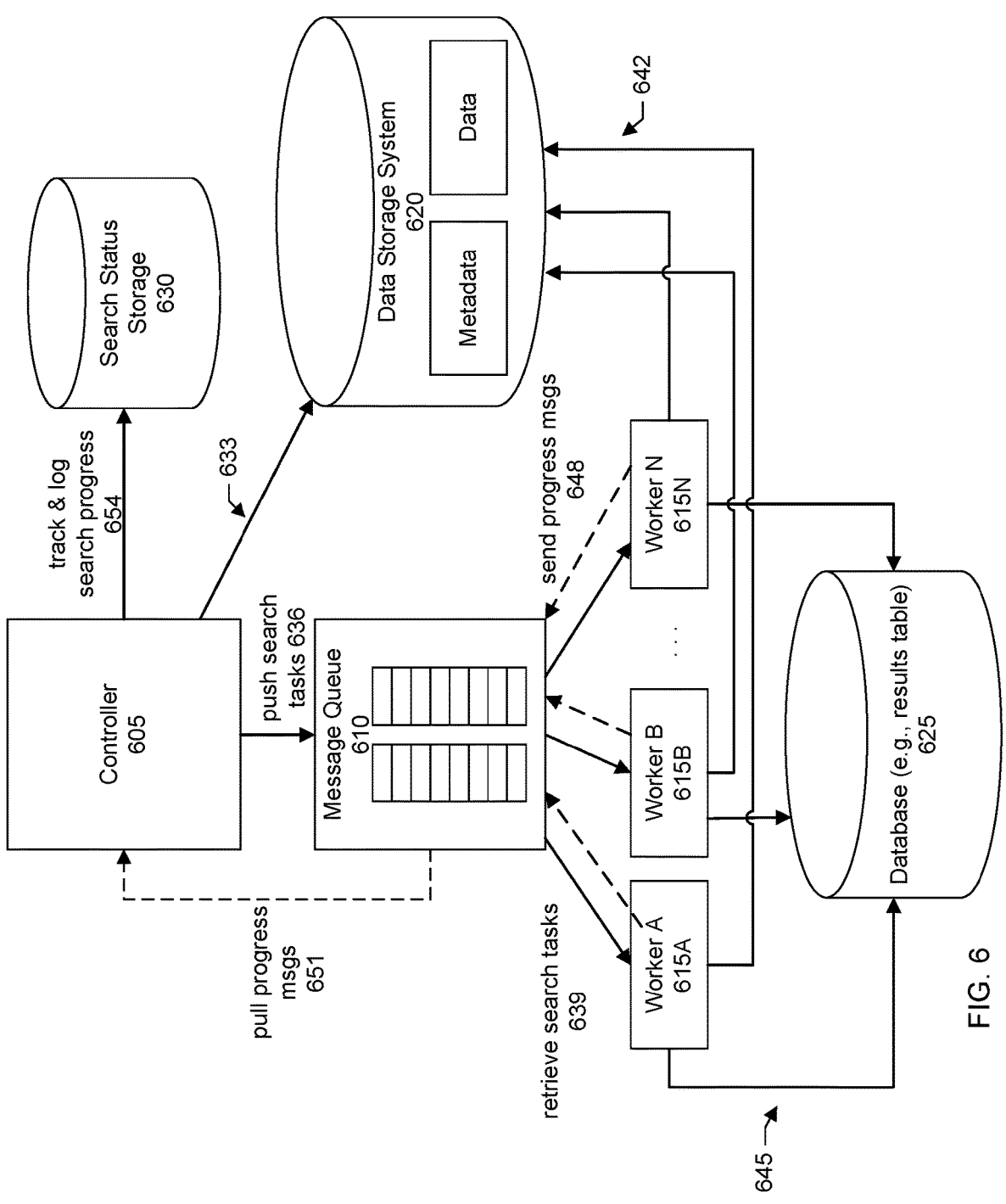
FIG. 6 shows further detail of a controller-worker architecture for conducting searches in accordance with one or more embodiments.

FIG. 6 shows further detail of a controller-worker architecture for conducting searches according to one or more embodiments. In the example shown in FIG. 6, there is a controller 605, message queue 610, set of workers 615A-N, data storage system 620, database or results table 625, and search status storage 630. In a specific embodiment, the data storage system is an object storage system.

The controller, upon receiving a search query, is responsible for the overall management of the search. In a specific embodiment, the search is divided into a first phase and a second phase. During the first phase, segments are read and a table is built listing any matches, including full and partial matches, of the search term in the segments. During the second phase of the search, a determination is made as to which objects, if any, that satisfy any filter criteria received with the search query happen to also reference a match in the table. The objects are identified and reported. A result of the search may include a listing identifying the objects having the search term and location or offset within the object at which the search term was found.

More particularly, in a specific embodiment, the first phase of the search includes the controller accessing 633 the object storage to retrieve metadata including fingerprint listings of segments to be searched for the search term. The controller generates tasks associated with conducting the search and pushes or places 636 the tasks to the message queue. A task may identify a subset of the fingerprint listings and thus a corresponding subset of segments to search. The controller may then allocate an initial number of workers to process the tasks.

The tasks are stored on the message queue until they are retrieved by the workers. The message queue provides a lightweight buffer which temporarily stores the tasks that are assigned to the workers. The message queue can be used to decouple heavyweight processing, to buffer or batch work, and to smooth spiky workloads. Each respective worker processes a respective task.

In a specific embodiment, a worker processes a task by examining a fingerprint listing identified in the task and reading 642 corresponding segments from the object storage to look for any matches of the search term in the segments. Matches, including full matches and partial matches, are recorded 645 in the database. A record for a match may include a fingerprint of a segment in which a match was found, an offset in the segment corresponding to the match, and the at least portion of the search term that was found or matched in the segment.

As the workers process the tasks, the workers send progress update messages 648 back to the controller via the message queue. The controller pulls 651 the progress messages from the message queue to track and log 654 a status or progress of the search in search status storage. Search status storage includes persistent storage. The search status storage may include a key-value store. If for any reason the search is interrupted, the search can be restarted without having to reprocess tasks that were already completed. In other words, upon resuming the search, the controller can examine the search status to identify tasks that were already completed, generate new tasks that need to be completed, push the new tasks to the message queue, and not push tasks that were already completed to the message queue.

During the second phase of the search, metadata and more specifically the fingerprint listings are filtered according to any filter settings or criteria that might have been received with the search query. The remaining fingerprint listings—which reference segments and specify a sequence or order in which the segments should be reconstructed for an object—are checked against the database (e.g., results table) for any matches. In particular, in this specific embodiment, a segment itself is read only once (e.g., during the first phase) even though there may be multiple references to the segment as a result of deduplication.

In this specific embodiment, the controller, after applying any filter settings to the fingerprint listings, generates another set of tasks that are pushed to the message queue for the workers to retrieve and process. A task may include a fingerprint listing (associated with an object) that a worker checks against the database for any matches. Similar to the first phase, the workers send back progress update message to the controller via the message queue which the controller then pulls and tracks in the search status storage. As in the first phase, this allows the search to be interrupted and later resumed without having to process tasks that were already completed prior to the interruption.

Referring back now to FIG. 5, consider, as an example, a search for the query string "ABC." Searching for the query string "ABC" should generate two matches in first object Obj1 and two matches in the second object Obj2. Note that the segment that corresponds to fingerprint Fp1 has "ABC", which is referenced by the first object Obj1 and first slice recipe SR1. As discussed, a segment may have many bytes where only a portion of the bytes match (full or partial) the search term. These other bytes are shown in FIG. 5 using ellipses. Thus, while segments 315E (represented by Fp5)

and 315F (represented by Fp6) both include the term "BC", the ellipses following the term indicate other different bytes such that segments 315E and 315F are different from each other.

The other matches are due to the string "ABC" being split across segment boundaries. In other words, the string "ABC" is straddled or spans across two segments. The segment with fingerprint Fp2 ends in "AB", while the segment represented by fingerprint Fp3 begins with "C". Since the second slice recipe SR2 references fingerprints Fp2 and Fp3 consecutively or sequentially, "ABC" exists in the second object Obj2, even though is split across two segments.

A similar case happens with fingerprint Fp4 where a segment ends with "A" and other segments (fingerprints Fp5 and Fp6) begin with "BC" and slice recipes reference those segments consecutively. It is noted that although the segments corresponding to Fp5 and Fp6 both begin with BC, the bytes after BC will be different if Fp5 and Fp6 are not equal.

The example of a query string being split across a segment boundary may be rare in practice. When a query string is short relative to the length of a segment, the query will likely complete exist within the segment, if the query exists at all. Nonetheless, it is desirable to handle both cases. Thus, systems and techniques are provided to handle both the case of a query fully within a segment as well as the case of a search term or query string being split across segment boundaries. In a specific embodiment, a query may be split across two segments. Since, in a specific embodiment, segments have a minimum size of 4 KB, this handles most reasonable-length queries. In another specific embodiment, a query may be split across more than two segments and the technique may be extended to handle arbitrarily long query strings (see FIG. 14 and discussion accompanying FIG. 14).

Upon receipt of the search query, the controller microservice is responsible for coordinating the work of the workers such as generating tasks associated with the search for the workers to perform. The controller microservice initiates the search and the one or more worker instances receive tasks from the controller. In a specific embodiment, the controller may place the tasks onto a message queue for retrieval by the workers. In a specific embodiment, these services run in containers within a Kubernetes environment, though other microservice environments are possible.

In a specific embodiment, where deduplication is not enabled, the controller may list (and possibly read) all of the object recipes, filter out those that do not meet the search criteria, and then pass the object recipe names to the worker microservice. Each worker receives one or more object recipe names and then begins the process of fully reading the logical object by progression from object recipe to slice recipes to reference data. An index structure is used to map from slice recipes to reference data. A worker may process multiple objects in parallel. In this specific embodiment, there can be a string search over the logical data, which is not accelerated by deduplication, though it is accelerated by allocating more workers for parallel reads.

In another specific embodiment, however, a string search is performed on the post-deduplication segments. In this specific embodiment, systems and techniques provide for building up a table of partial and full query matches in phases, and then determining which objects reference those segments. As discussed, in this specific embodiment, a segment is only read once even if it is referenced multiple times by objects. For example, in FIG. 2, segments 220A and 220B are referenced multiple times (e.g., by both the first and second files). Systems and techniques are provided to allow a search in which a deduplicated segment is read a single time even though the segment may be referenced two or more times.

FIG. 7 shows a detail flow for a first phase of the search. In the first phase, the controller lists all of the compression regions and sends the compression region names or assigns the compression regions to the worker microservice (step 710). Each worker may process multiple compression regions in parallel. A worker reads in a compression region (step 715), decompresses segments in the compression region (step 720), and perform a search (e.g., text search) for the query string or search term (step 725). Compression regions are groups of compressed segments. It should be appreciated, however, that the use of compression regions is merely an example of a storage technique for a particular storage system. Other storage systems may or may not employ compression regions. For example, other storage systems may store uncompressed segments individually, compressed segments individually, or groups of uncompressed segments. The systems and techniques described herein can be applied to handle searches of those other storage systems as well.

In a step 730, full matches are recorded in the database (e.g., results table). Each record for a full match may include the search term and a fingerprint of a segment in which the search term was found as well as the offset within the segment.

Certain types of partial matches are also recorded in the database. In particular, in a step 735, first types of partial matches are recorded in the database, each record for a partial match of a first type may include a beginning portion or beginning part of the search term and a fingerprint of a segment in which the beginning portion of the search term was found at an end of the segment. The beginning portion or part of the search term may be referred to as a prefix.

In a step 740, second types of partial matches are recorded in the database, each record for a partial match of the second type may include an ending portion or ending part of the search term and a fingerprint of a segment in which the ending portion of the search term was found at a start of the segment. The ending portion or part of the search term may be referred to as a suffix.

In other words, in a specific embodiment, there are four cases to consider. A first case is when the full search term (e.g., text string) appears in the segment. For example, FIG. 5 shows some sample data stored in the object storage. Consider that a search query including the search term "ABC" has been received.

In the sample data for the object storage shown in FIG. 5, a read and search of the segments for the search term "ABC" results in a full match with first segment 315A having first fingerprint Fp1. This match is recorded in the database with a record of the form <"ABC", Fp1>.

A second case is when the segment ends with a prefix or beginning portion of the search term (e.g., text string). This is recorded as a partial match record in the database. Examples according to the sample data in FIG. 5 include <"AB", Fp2> and <"A", Fp4>.

In other words, there is a partial match with second segment 315B having second fingerprint Fp2 because a prefix of the search term (e.g., "AB") appears at an end of the second segment. Thus, this partial match is recorded in the database with the form <"AB", Fp2>.

Similarly, there is a partial match with fourth segment 315D having fourth fingerprint Fp4 because a prefix of the search term (e.g., "A") appears at an end of the fourth segment. Thus, this partial match is recorded in the database with the form <"A", Fp4>. These types of partial matches in which a beginning portion of a search term is found at an end of a segment may be referred to as partial matches of the first type.

A third case is when the segment beings with a suffix or ending portion of the search term (e.g., text string). This is recorded as a partial match record in the database. Examples according to the sample data in FIG. 5 include <"C", Fp3>, <"BC", Fp5>, and <"BC", Fp6>.

In other words, there is a partial match with third segment 315C having third fingerprint Fp3 because a suffix of the search term (e.g., "C") appears at a start of the third segment. Thus, this partial match is recorded in the database with the form <"C", Fp3>.

There is a partial match with fifth segment 315E having fifth fingerprint Fp5 because a suffix of the search term (e.g., "BC") appears at a start of the fifth segment. Thus, this partial match is recorded in the database with the form <"BC", Fp5>.

There is a partial match with sixth segment 315F having sixth fingerprint Fp6 because a suffix of the search term (e.g., "BC") appears at a start of the sixth segment. Thus, this partial match is recorded in the database with the form <"BC", Fp6>. These types of partial matches in which an ending portion of a search term is found at a start of a segment may be referred to as partial matches of the second type.

A fourth case is when the search term (e.g., query string) does not fully or partially match the segment. Cases in which a portion of the search term is found in a middle of a segment do not qualify as partial matches because the segment will not join with another segment to complete the match. That is, the interest is only for partial query string matches at the beginning or ending positions within a segment since these are possibly splits of a full query string match. Partial matches at other positions within a segment are ignored since they cannot be extended to a full match.

Table A below shows an example records that may be stored in the database (e.g., results table) after the first phase is complete based on the sample data shown in FIG. 5.

TABLE A

| Record Number | Match Type | Search Term | Fingerprint |
|---|---|---|---|
| 1 | Full match | ABC | Fp1 |
| 2 | Partial prefix match | AB | Fp2 |
| 3 | Partial prefix match | A | Fp4 |
| 4 | Partial suffix match | C | Fp3 |
| 5 | Partial suffix match | BC | Fp5 |
| 6 | Partial suffix match | BC | Fp6 |

Once all the segments have been searched, the process moves to the next or second phase of the algorithm. All of the full and partial matches are now in the database (see, e.g., Table A). More particularly, with regards to partial matches, a determination is made as to whether a partial match in one segment should combine with a partial match in another segment to make a full match. The determination is based on reviewing metadata indicating an order in which the segments are to be reconstructed for an object. The metadata may indicate that a particular object did not reference those segments or did reference those segments, but not consecutively (i.e., not according to a fingerprint sequence in which the segments are to be assembled to reconstruct the object).

Figure 8:
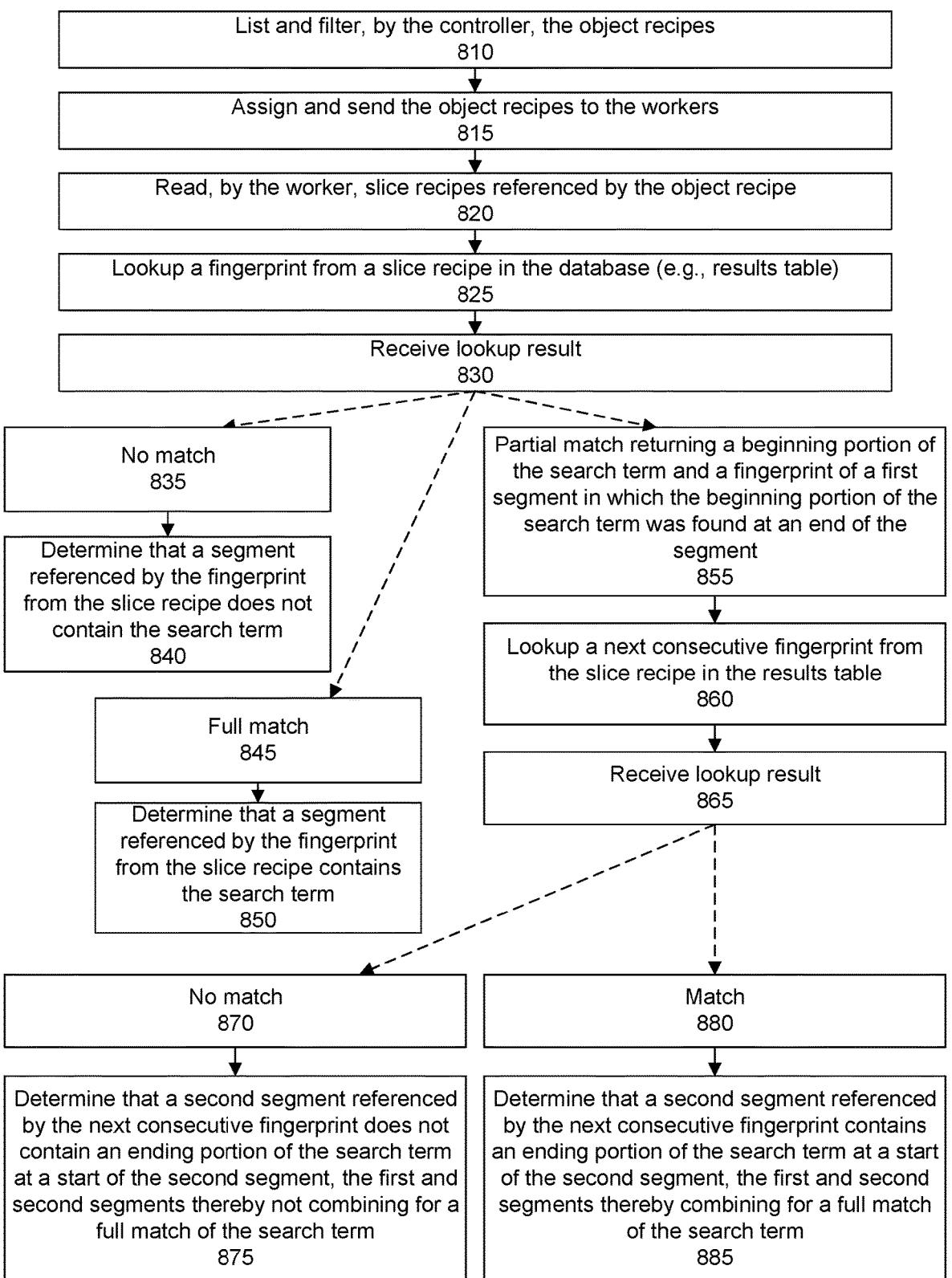
FIG. 8 shows a flowchart of a second phase for conducting a search where a determination is made as to which objects, if any, reference matches in the results table in accordance with one or more embodiments.

FIG. 8 shows a flow of a second phase of the algorithm in which an identification is made of which objects, if any, reference the matches recorded in the database (e.g., results table). In other words, in a specific embodiment, as segments are read and searched for the search term, a database of results is built. Each record in the database includes a fingerprint of a segment in which there was a match (e.g., full or partial) of the search term. A next phase is to identify objects, e.g., customer written-objects such as files, corresponding to the segment matches in the database. The identification can be accomplished by reviewing the metadata against the matches recorded in the database and without having to reread segments.

In a step 810, the controller lists and filters the object recipes. For example, object recipes corresponding to objects that do not satisfy the query's filter settings or criteria (e.g., date range, folder path, owner, and so forth) may be filtered out.

In a step 815, the controller assigns and sends the filtered object recipes to the workers. The filtered object recipes are the object recipes that remain after the filter criteria has been applied to remove from consideration object recipes (and thus corresponding objects) that do not meet the customer's filter criteria. In a step 820, a worker reads slice recipes referenced by the object recipe. In a step 825, the worker looks up a fingerprint from a slice recipe in the database. In a step 830, the worker receives a lookup result.

The lookup may return a non-match, e.g., fingerprint not found in database (step 835). In this case, a determination is made that a segment referenced by the fingerprint from the slice recipe does not contain the search term (step 840).

The lookup may return a full match (step 845). In this case, a determination is made that the segment referenced by the fingerprint from the slice recipe contains the search term (step 850). Thus, the segment referenced by the fingerprint is part of an object having the search term and an identification of the object can be reported.

The lookup may return a partial match including a beginning portion of the search term and a fingerprint of a first segment in which the beginning portion of the search term was found at an end of the segment (step 855). In this case, a lookup is made of an immediate or next consecutive fingerprint from the slice recipe using the database or results table (step 860). In a step 865, a lookup result is received.

In a step 870, the lookup may return a non-match. In this case, in a step 875, a determination is made that a second segment referenced by the next consecutive fingerprint in the slice recipe does not contain an ending portion of the search term at a start of the second segment, the first and second segments thereby not combining for a full match of the search term. Thus, the first and second segments are not part of an object having the search term.

Alternatively, in a step 880, the lookup may return a match. In this case, in a step 885, a determination is made that a second segment referenced by the immediate or next consecutive fingerprint in the slice recipe contains an ending portion of the search term at a start of the second segment, the first and second segments thereby combining for a full match of the search term. Thus, the first and second segments are part of an object having the search term and an identification of the object can be reported. In other words, the worker confirms whether or not the slice recipe includes the fingerprint of the second segment and also the order or sequence of the fingerprint in the slice recipe.

In a specific embodiment, the worker queries for a fingerprint. If the result is a prefix match, then the worker queries for the next consecutive fingerprint to see if it returns a suffix match. If so, the worker checks if the prefix and suffix combine to form the full query term.

As an example, consider again the sample data shown in FIG. 5. First object recipe Obj1 references first slice recipe SR1 310A and second slice recipe SR2 310B. First slice recipe SR1 includes a fingerprint listing having first fingerprint Fp1. A lookup of first fingerprint Fp1 in the database (see, e.g., Table A), returns a first record indicating a full match. Thus, a determination is made that a segment (e.g., segment 315A) referenced by the fingerprint (e.g., Fp1) from the slice recipe (e.g., SR1) contains the search term (step 750, FIG. 7). In other words, there is a match in the first object for the search term.

Second slice recipe SR2 includes a fingerprint listing having second fingerprint Fp2. A lookup of second fingerprint Fp2 in the database (see, e.g., Table A), returns a second record indicating a partial prefix match—<"AB", Fp2>. A next consecutive fingerprint in the slice recipe is third fingerprint Fp3. A lookup of third fingerprint Fp3 in the database returns a fourth record indicating a partial suffix match—<"C", Fp3>. Thus, a determination is made that third segment referenced by third fingerprint Fp3 contains an ending portion of the search term at a start of the third segment. Second segment referenced by second fingerprint Fp2 and third segment referenced by third fingerprint Fp3 thus combine for a full match of the search term. (see, e.g., steps 855, 860, 865, 880, and 885 FIG. 8). In other words, there is another match in the first object for the search term.

Second object recipe Obj2 references third slice recipe SR3 and fourth slice recipe SR4. Third slice recipe SR3 includes a fingerprint listing having fourth fingerprint Fp4. A lookup of fourth fingerprint Fp4 in the database (see, e.g., Table A), returns a third record indicating a partial prefix match—<"A", Fp4>. A next consecutive fingerprint in the slice recipe is fifth fingerprint Fp5. A lookup of fifth fingerprint Fp5 in the database returns a fifth record indicating a partial suffix match—<"BC", Fp5>. Thus, a determination is made that fifth segment referenced by fifth fingerprint Fp5 contains an ending portion of the search term at a start of the fifth segment. Fourth segment referenced by fourth fingerprint Fp4 and fifth segment referenced by fifth fingerprint Fp5 thus combine for a full match of the search term. (see, e.g., steps 855, 860, 865, 880, and 885 FIG. 8). In other words, there is a match in the second object for the search term.

Fourth slice recipe SR4 includes a fingerprint listing having fourth fingerprint Fp4. A lookup of fourth fingerprint Fp4 in the database (see, e.g., Table A), returns a third record indicating a partial prefix match—<"A", Fp4>. A next consecutive fingerprint in the slice recipe is sixth fingerprint Fp6. A lookup of sixth fingerprint Fp6 in the database returns a sixth record indicating a partial suffix match—<"BC", Fp6>. Thus, a determination is made that sixth segment referenced by sixth fingerprint Fp6 contains an ending portion of the search term at a start of the sixth segment. Fourth segment referenced by fourth fingerprint Fp4 and sixth segment referenced by sixth fingerprint Fp6 thus combine for a full match of the search term. (see, e.g., steps 855, 860, 865, 880, and 885 FIG. 8). In other words, there is another match in the second object for the search term.

FIG. 9 shows a flow for the second phase of a search algorithm according to another specific embodiment. The flow in FIG. 9 is similar to the flow in FIG. 8. In the flow of FIG. 9, however, partial matches in the database (e.g., results table) are merged before determining which objects, if any, reference the matches the database.

Specifically, at a start of the flow (as in FIG. 8), all of the full and partial matches are in the database (see, e.g., Table A).

In a step 905, the partial matches in the database are merged to form full matches. To form full matches from partial matches, for each prefix, the database is queried to check if there are suffixes that complete the match. If so, new records are generated indicating a full match and the corresponding fingerprints. Based on the sample data shown in Table A, examples include <"ABC", Fp2, Fp3>, <"ABC", Fp4, Fp5>, <"ABC", Fp4, Fp6>

Table B below shows a summary of the merge operation.

TABLE B

| Record Number | Search Term | Fingerprint |
|---|---|---|
| 1 | ABC | Fp1 |
| 7 | ABC | Fp2, Fp3 |
| 8 | ABC | Fp4, Fp5 |
| 9 | ABC | Fp4, Fp6 |

Next, the algorithm advances to determining which objects include the query text. The controller lists or reads all of the object recipes, filters those that do not meet the search criteria, and sends the object recipe names (or full objects) to the worker microservice. Each worker may process one or more object recipes in parallel by beginning to read the corresponding slice recipes. (steps 910, 915, and 920—FIG. 9).

For a slice recipe, the worker checks whether each fingerprint has a record in the database of full matches. If there is a match of the form <"search term", FpX>, e.g., <"ABC", FpX>, then there is a complete match within a single segment.

If there is a match of the form <"search term", FpX, FpY>, e.g., <"ABC", FpX, FpY>, then the worker checks whether FpY is the next consecutive fingerprint in the slice recipe. The next consecutive fingerprint may be the first fingerprint of the next consecutive slice recipe for this object recipe. If there is a match (with one or two fingerprints), this result is reported to the customer.

More particularly, in a step 925, a lookup is made of a fingerprint from a slice recipe in the database. In a step 930, a lookup result is received.

The lookup may return a non-match, e.g., fingerprint not found in the database (step 935). In this case, a determination is made that a segment referenced by the fingerprint from the slice recipe does not contain the search term (step 940).

The lookup may return a match indicting a complete match within a single segment (step 945). In this case, a determination is made that a segment referenced by the fingerprint from the slice recipe contains the search term.

As an example, consider again the sample data shown in FIG. 5. First object recipe Obj1 references first slice recipe SR1 310A and second slice recipe SR2 310B. First slice recipe SR1 includes a fingerprint listing having first fingerprint Fp1. A lookup of first fingerprint Fp1 in the database (see, e.g., Table B), returns a first record indicating a full match, e.g. <"ABC", Fp1>. Thus, a determination is made that a segment (e.g., segment 315A) referenced by the fingerprint (e.g., Fp1) from the slice recipe (e.g., SR1) contains the search term (step 950, FIG. 9). In turn, a determination is made that the first object includes a match to the search term.

The lookup may return a match indicating a merged full match from first and second segments referenced by first and second fingerprints, respectively (step 955). In this case, in a step 960, a check is performed as to whether the second fingerprint is the next consecutive fingerprint in the slice recipe. As discussed, the next consecutive fingerprint may be the first or initial fingerprint of the next slice recipe for this object recipe.

If the second fingerprint is not the next fingerprint in the slice recipe or is not the initial fingerprint in the next slice recipe (step 965), a determination is made that the second segment referenced by the second fingerprint is not part of an object having the first segment (step 975).

As an example, consider again the sample data shown in FIG. 5. First object Obj1 also references second slice recipe SR2 310B. Second slice recipe SR2 includes a fingerprint listing having second fingerprint Fp2. A lookup of second fingerprint Fp2 in the database (see, e.g., Table B), returns a seventh record indicating a merged full match—<"ABC", Fp2, Fp3>. A check is then performed as to whether third fingerprint Fp3 is the next consecutive fingerprint in the slice recipe (or initial fingerprint of the next slice recipe for this object recipe).

In this example, second slice recipe 310B does list third fingerprint Fp3 as the next consecutive fingerprint. Thus, a determination may be made that the first object includes another match of the search term.

Second object recipe Obj2 references third slice recipe SR3 and fourth slice recipe SR4. Third slice recipe SR3 includes a fingerprint listing having fourth fingerprint Fp4. A lookup of fourth fingerprint Fp4 in the database (see, e.g., Table B), returns an eighth record indicating a merged full match—<"ABC", Fp4, Fp5>. A check is then performed as to whether fifth fingerprint Fp5 is the next consecutive fingerprint in the slice recipe (or initial fingerprint of the next slice receipt for this object recipe).

In this example, third slice recipe SR3 does list fifth fingerprint Fp5 as the next consecutive fingerprint. Thus, a determination may be made that the second object includes a match of the search term.

Fourth slice recipe SR4 includes a fingerprint listing having fourth fingerprint Fp6. A lookup of fourth fingerprint Fp4 in the database (see, e.g., Table B), returns a ninth record indicating a merged full match—<"ABC", Fp4, Fp6>. A check is then performed as to whether sixth fingerprint Fp6 is the next consecutive fingerprint in the slice recipe (or initial fingerprint of the next slice recipe for this object recipe).

In this example, fourth slice recipe SR4 does list sixth fingerprint Fp6 as the next consecutive fingerprint. Thus, a determination may be made that the second object includes another match of the search term.

The technique shown in FIG. 9 and described in the accompanying discussion includes a possibility for numerous database records being generated in this phase. The number of records could be as high as N^2 where N is the number of prefix and suffix partial matches. This may fit within the capacity of the database. However, if the number of generated matches exceeds the capacity of the database, the technique shown in FIG. 8 and described in the accompanying discussion may be used. If there are no full matches even after the merge operation, the process can stop and results reported to the customer indicating that there are no matches of the search term.

In a specific embodiment, once the search is complete and results reported to the customer, the records in the database or results table may be deleted in order to reclaim space and provide space or capacity for a next search query that may be received. A new or different database or results table may then be built for the next search query.

Deciding whether to merge partial matches in the database (FIG. 9) or not merge the partial matches (FIG. 8) before checking whether any objects references the matches may be based on any number of factors such as a maximum capacity of the database, number of records recorded in the database after phase 1, costs for database lookups, other factors, or combinations of these. For example, merging the partial matches to form full matches (FIG. 9) can reduce the number of database lookups as compared to not merging the partial matches (FIG. 8). Further, if the database does not include any full matches even after the merge operation, the search can be stopped without having to advance to the process of checking which objects reference matches in the database and a determination made that there are no matches of the search term.

In some embodiments, a hybrid or dynamic selection technique may be used. For example, if a number of partial matches in the database is below a threshold number, the partial matches may be merged before continuing to check whether any objects reference the matches. If the number of partial matches in the database is above the threshold number, the partial matches may not be merged before continuing to check whether any objects reference the matches.

Embodiments have described a text search as applying to a single query term. It should be appreciated, however, that multiple query terms can be handled in a similar manner. In a specific embodiment, the database records can be modified to indicate the term so that only prefixes and suffixes for the same term can be joined together. In other words, the database record may be modified to contain the full query term to avoid collisions between terms. As discussed, embodiments allow for text queries or arbitrary binary queries.

FIG. 10 shows a flow for a first phase the search algorithm for a microservices architecture having a queue where segments are searched for a search term and matches recorded in a database or results table according to one or more embodiments.

In a step 1010, a controller generates a set of tasks associated with a search query including a search term. Each task identifies a compression region storing deduplicated segments of objects in a deduplicated storage system.

In a step 1015, the controller places the tasks onto a queue for retrieval by a set of workers. In a step 1020, a worker retries a task from the queue. In a step 1025, the worker processes the task by reading and searching each segment of a compression region identified in the task for the search term.

In a step 1035, if a match is not found, task processing continues (step 1040). If, however, if a match is found, in a step 1045, the worker creates a record in a database where the record includes a fingerprint of a segment in which the search term was found or matched (full match or partial match).

FIG. 11 shows a flow for a second phase the search algorithm for the microservices architecture in which a determination is made as to which objects, if any, reference the matches recorded in the database table according to one or more embodiments.

In a step 1110, a controller obtains a set of object recipes corresponding to objects stored to a deduplicated storage system. Each object recipe references one or more slice recipes. Each slice recipe includes a listing of fingerprints, in consecutive order, of segments into which the objects have been divided.

In a step 1115, the controller filters the set of object recipes according to filter settings received with a search query to obtain a subset of the object recipes.

In a step 1120, the controller generates a set of tasks associated with processing the subset of object recipes. In a step 1125, the controller places the tasks onto a queue for retrieval by a set of workers. The queue can hold any number of tasks. In a step 1130, a worker retrieves a task from the queue.

In a step 1135, the worker processes the task by reading a slice recipe of an object recipe from the task. The worker checks fingerprints listed in the slice recipe against a database having records of matches to a search term of the search query, each record including a fingerprint of a segment in which a match was found. Once the worker completes a task, the worker can pull another task from the queue. In a specific embodiment, the workers may be multi-threaded so that a worker can handle multiple (e.g., two or more) tasks at a time.

Resources such as services and computational nodes of the deduplicated storage system can be allocated and freed dynamically. In between search operations, compute nodes hosting workers, for example, can be turned off to save computation costs. The search service can be scaled dynamically using containers running the microservices across multiple hosts.

In a specific embodiment, the controller can monitor the task message queue (as, for example, described in the discussion accompanying FIGS. 10 and 11) to assess a status of the search. The queue can be used to receive and store messages for retrieval.

Based on the monitoring, a number of workers can be adjusted dynamically so that the search completes within a desired period of time, within a desired cost budget, and with an efficient use of resources. The monitoring may include tracking a current count or number of tasks remaining on the message queue for processing. When the current count exceeds a threshold, one or more additional workers may be allocated. For example, the controller may start another worker. The monitoring may include tracking costs for line items such as a number of worker nodes currently allocated or other service costs that may be charged by a cloud storage provider. If a projected cost for the search is expected to exceed a threshold budget, one or more workers may be deallocated. Thus, the time to complete the search may be extended, but the cost of the search will be reduced.

When the current count falls below a threshold, one or more existing workers may be deallocated. That is, an initial number of workers may be allocated at a start of a search operation in response to a search query having been received. During the search operation, the number of workers may be changed to a new number of workers different from the initial number of workers. The new number may be greater than the initial number. The new number may be less than the initial number.

The number of workers initially allocated for the first and second search phases may be different from each other. For example, a number of workers initially allocated for the first phase may be based on a number of compression regions and thus segments to be read and searched. The number of workers to allocate may be proportionate to the number of compression regions.

For the second phase of the search, a number of workers initially allocated may be based on the number of record matches in the database. The number of workers to allocate may be proportionate to the number of records in the database.

In a specific embodiment, as workers retrieve and process tasks from the queue, the workers may report or log status to a task status queue. The status may include an identification of compression regions and segments searched. The status may include an identification of slice recipes checked against the database of matches. The task status queue, along with the database, may be saved to persistent storage. If the search operation happens to be interrupted, such as by a node or host crash, the search operation can later be restarted from where it was interrupted without having to repeat the portion of search tasks before the interruption. In other words, if a node hosting the controller crashes, a new controller brought up on a new or recovered node can check the task status queue for the search status. By checking the status queue, the controller can determine which compression regions and segments have already been searched and which slice recipes have already been processed.

The controller may track, for each worker, an amount of time that elapsed since a worker last reported status. If the elapsed amount of time exceeds a threshold duration, the controller may recreate the task and again push the task to the task queue. The controller may mark the non-responsive worker as unavailable.

The processing of a search task may occur in parallel, concurrently, or simultaneously with the processing of other search tasks. For example, while a first worker is processing a first search task, a second worker may be processing a second search task.

In another specific embodiment, the position within the object (or file) where a query term is found can also be returned. This can be especially helpful in cases where the object searched is very large such as a virtual machine image. In this specific embodiment, the record format in the database can be modified to record the offset within the segment where the query term is found. In this specific embodiment, while a worker processes a slice recipe, the worker tracks the logical offset processed. This is supported because the slice recipe has not only each segment fingerprint, but also the segment size. When the worker finds a match in the database, the worker can add the offset within the segment to its current total offset within the object to calculate the query term's offset in the object. A method may include searching a set of segments for a query term, and upon finding the query term in a segment, creating a record in a database, the record including a fingerprint of the segment and an offset within the segment where the query term was found.

For example, Table C below shows an example of the results table or database recording an offset in a segment in which the term was found.

TABLE C

| Record Number | Match Type | Search Term | Fingerprint | Offset (e.g., byte position) |
|---|---|---|---|---|
| 1 | Full match | ABC | Fp1 | offsetK |
| 2 | Partial prefix match | AB | Fp2 | offsetL |
| 3 | Partial prefix match | A | Fp4 | offsetM |
| 4 | Partial suffix match | C | Fp3 | offset |
| 5 | Partial suffix match | BC | Fp5 | offsetO |
| 6 | Partial suffix match | BC | Fp6 | offsetP |

In other words, the search service can further return the position within the object (or file) where the query matches.

In this specific embodiment, the database record format records an offset in a segment where it matches. As a worker processes a slice recipe, the worker sums up the segment sizes preceding the match and then adds the offset within the matching segment. Thus, in a specific embodiment, a search result returned to the customer in response to their search query may include the offset (e.g., position or location) within the customer's data or object where the match occurred along with the name of the object or file.

FIG. 12 shows a flow for returning the offset (e.g., position or location) within an object where a match occurred. In a step 1210, a deduplicated storage system is maintained for objects. The storage system includes object recipes, slice recipes, and compression regions. The compression regions store deduplicated segments of the objects. Each slice recipe includes segment fingerprints organized consecutively and identifies a size of each segment referenced by a fingerprint in a slice recipe. Each object recipe corresponds to an object and includes one or more slice recipes organized consecutively.

In a step 1215, a search query including a search term is received. In a step 1220, a slice recipe is selected for processing. In a step 1225, the slice recipe is processed by searching each segment referenced by a fingerprint in the slice recipe for at least a portion of the search term.

In a step 1230, during the processing logical offsets of segments previously searched are tracked to maintain a current or running total offset associated with an object corresponding to an object recipe referencing the slice recipe.

In a step 1235, a determining is made as to whether there is a match. As discussed, a match may include full or partial matches. If there is not a match, slice recipes continue to be processed (step 1240). If, however, a match has occurred, in a step 1245, a record is created in a database (e.g., results table). The record includes the search term, a fingerprint of a particular segment in which the search term was matched, and an offset in the particular segment at which the search term was matched.

In a step 1250, the offset is added to the current total offset associated with the object to mark a position within the object at which the search term was matched.

In a specific embodiment, a method may include maintaining, for objects in a deduplicated storage system, a plurality of object recipes, slice recipes, and compression regions, wherein the compression regions store deduplicated segments of the objects, each slice recipe comprises a plurality of segment fingerprints organized consecutively and identifies a size of each segment referenced by a fingerprint in a slice recipe, and each object recipe corresponds to an object and comprises one or more slice recipes organized consecutively; receiving a search query comprising a search term; processing a first slice recipe to search each segment referenced by a fingerprint in the first slice recipe for at least a portion of the search term; during the processing, tracking logical offsets of segments searched to maintain a running total offset associated with a first object corresponding to a first object recipe referencing the first slice recipe; matching at least a portion of the search term in a particular segment; upon the matching, creating a record in a database, the record comprising the at least portion of the search term, a fingerprint of the particular segment, and offset in the particular segment at which the at least portion of the search term was matched; and adding the offset to the running total offset to mark a position within the first object at which the at least portion of the search term was matched.

In an another specific embodiment, for parallel handling of large objects, workers may split the work of processing a large object across multiple threads within a worker or possibly across multiple workers. Each thread or worker may be assigned a partition of the slice recipes for a worker to perform the search. To handle the prefix and suffix cases, each worker is allowed to consider a next fingerprint beyond its partition of slice recipes.

FIG. 13 shows an example of a flow for handling a search of a large object using multiple workers or worker nodes. In a step 1305, an identification is made of a set of slice recipes of an object recipe corresponding to an object to be searched for a search term.

In a step 1310, the set of slice recipes are partitioned, divided, or grouped into subsets of slice recipes having one or more slice recipes. In a step 1315, subsets of the slice recipes are assigned to a set of workers to process, each worker being assigned one or more slice recipes.

The number of subsets or groups of slice recipes may be based on the number of workers. The number of subsets or groups of slice recipes to form may be determined by dividing a number of slice recipes in the object recipe by a number of workers that are available. As an example, consider that the object recipe references 15 slice recipes (slice recipes A-O) and there are 5 workers available. In this example, there can be 3 subsets or groups of slice recipes to assign (e.g., 15 slice recipes divided by 5 equals 3). Thus, a first subset of slice recipes (e.g., slice recipes A-E) may be assigned to a first worker. A second subset of slice recipes (e.g., slice recipes F-J) may be assigned to a second worker. A third subset of slice recipes (e.g., slice recipes K-O) may be assigned to a third worker.

In a step 1320, each worker is allowed to examine another fingerprint in another slice recipe assigned to a different worker, where the other slice recipe is a next consecutive slice recipe (according to the object recipe) after a last slice recipe assigned to the worker, and the other fingerprint is an initial fingerprint in the next consecutive slice recipe. This allows for handling cases where the search term happens to be split across segments where a fingerprint for one of the segments happens to be listed in a slice recipe assigned to one worker and another fingerprint happens to be listed in a slice recipe assigned to another worker.

Thus, in continuing with the example above, the first worker may be allowed to examine an initial fingerprint in slice recipe F because slice recipe F is a next consecutive slice recipe after a last slice recipe (e.g., slice recipe E) assigned to the first worker. This allows for handling a case where a portion of the search term has been found or matched in a last segment referenced by a last fingerprint in slice recipe E. The first worker can examine another fingerprint—initial fingerprint in slice recipe F—to determine whether there is record in the results table corresponding to the initial fingerprint that will complete a match. Alternatively, a large object to process may be broken down by size. For example, a first 100 GB of an object may be assigned to a first worker to process. A second 100 GB of the object may be assigned to a second worker to process, and so forth.

The systems and techniques described for particular embodiments may be combined with systems and techniques described for other particular embodiments. For example, in a specific embodiment, a search may include assigning different object recipes to different workers as shown, for example, in FIG. 8 with each worker being responsible for processing a particular object recipe (and thus slice recipes referenced by the object recipe).

In another specific embodiment, a search may include assigning different slice recipes of an object recipe to different workers as shown, for example, in FIG. 13. In another specific embodiment, such as when there are objects spanning many different sizes, a search may include some workers being assigned complete object recipes and other workers being assigned portions of object recipes (e.g., slice recipe subsets) to process. For example, in this specific embodiment, there can be a threshold object size. The threshold object size may, for example, correspond to a number of slice recipes in an object recipe of an object. If a number of slice recipes in an object recipe exceeds a threshold, slice recipe groups of the object recipe are formed. Some workers may be assigned slice recipe groups from a single object recipe to process. If a number of slice recipes for another object recipe is below the threshold, a single worker may assigned responsibility for processing all the slice recipes of the object recipe.

FIG. 14 shows a flow for handling a search query having a search term that may span more than two segments. For example, in some cases, a customer client may submit with a search query multiple pages from a document or even the complete text of the document rather than merely a title of the document. The customer may be interested in finding, for example, whether there are any objects having large portions of text from the document. The flow shown FIG. 14 is similar to the flows shown in, for example, FIGS. 7 and 8, but further includes recording matches where a middle portion of the search term was found to extend across a segment.

In brief, to handle a search query that goes beyond two segments, an algorithm recognizes that a query could match fully within a segment, an end of a segment could have a prefix (e.g., beginning portion) of the query, a beginning of a segment could have a suffix (e.g., ending portion) of the query, or the entire segment could consist of an infix (e.g., middle portion) of the query.

These records go into the database. When processing the fingerprint sequence, if the database record is a prefix, the algorithm checks if the next fingerprint in the sequence has a record in the database that is the next part of the query, which could be an infix or suffix of the query. If it is an infix, then the algorithm continues checking if the next fingerprint in the sequence has a database record that is the next consecutive infix or suffix needed. The process repeats until a suffix is found or the query is not completed.

More particularly, in a step 1420, a search is performed of each segment for the search term. The search may proceed as shown in FIG. 10 and described in the discussion accompanying FIG. 10. The search of a particular segment for the search term may result in there being no match in which case there is nothing to record in the database (e.g., results table). Alternatively, a beginning portion of the search term may be found or matched at an end of a segment (step 1415); an ending portion of the search term may be found or matched at a start of a segment (step 1420); or a middle portion of the search term may be found or matched across an entire portion of a segment (step 1425).

In a step 1430, these matches or findings are recorded as records in the database. A record of match may include the beginning, ending, or middle portion of the search term and a fingerprint of a segment in which the respective beginning, ending, or middle portion of the search term was found or matched. The record may further include the corresponding offset within the segment at which the match was located so that the search term's location or position within an object can be reported.

The process of reading segments and recording any matches in the database continues until all segments have been read. As discussed, once the all segments have been read and the database of matches built, an identification is made of which objects, if any, happen to reference a match in the database. Filter settings received with the search query are applied to the metadata including fingerprint listings. The remaining fingerprint listings that thus meet, pass, or satisfy the filter settings are checked against the database to determine whether there are any records of those fingerprints and thus matches.

More particularly, in a step 1435, slice recipes referenced by an object recipe of an object are read. In a step 1440, a lookup in the database is performed using a first fingerprint from a slice recipe.

In a step 1445, a first record may be received having the matching first fingerprint and the beginning portion of the search term, the first fingerprint thereby corresponding to a first segment in which the beginning portion of the search term was found at an end of the first segment.

Thus, it may be possible for there to be one or more other segments recorded in the database that when properly assembled in the correct order combine with the first segment to form a full match of the search term.

Specifically, in a step 1450, a lookup in the database is performed using a second fingerprint from the slice recipe, where the second fingerprint is a next consecutive fingerprint with respect to the first fingerprint in the slice recipe.

The lookup of the second fingerprint may not return a record or match. Alternatively, a record may be returned identifying a segment that combines with the first segment to form (or move closer to) a full match of the search term.

For example, in a step 1455, a second record may be received having the matching second fingerprint and ending portion of the search term, the second fingerprint thereby corresponding to a second segment in which the ending portion of the term was found at a start of the second segment.

In a step 1450, the object is identified as having the term because the object references the first and second segments.

Alternatively, in a step 1465, a second record may be received having the matching second fingerprint and a middle portion of the search term, the second fingerprint thereby corresponding to a second segment in which the middle portion of the search term was found to extend across the second segment.

Thus, there may be another segment recorded in the database that when properly assembled in the correct order combines with the first and second segments to form a full match of the search term.

Specifically, in a step 1470, a lookup in the database is performed using a third fingerprint from the slice recipe, where the third fingerprint is a next consecutive fingerprint with respect to the second fingerprint in the slice recipe.

In a step 1475, a third record may be received having the matching third fingerprint and ending portion of the search term, the third fingerprint thereby corresponding to a third segment in which the ending portion of the search term was found at a start of the third segment.

In a step 1480, upon finding that the first, second, and third segments combine to form a full match of the search term, the object is identified as having the search term because the object references the first, second, and third segments.

It should be appreciated that the technique shown in FIG. 14 can be applied to cases in which the query is split across any number of segment boundaries or segments. Portions of the search term may be matched in 4, 5, 6, 7, 8, 9, 10, or more than 10 segments. For example, a first middle or intermediate portion of a search term may be found to extend across a first segment. A second middle or intermediate portion of the search term may be found to extend across a second segment, and so forth. These matches can be recorded in the database during the first phase of the search. During the second phase of the search, iterative fingerprint queries or lookups can be made against the database to determine whether a complete match of the search term can be assembled or constructed using the matches recorded in the database.

The search algorithm described herein is useful for performing efficient text searches over deduplicated storage. There may be situations, however, when it may be more efficient to perform a search by reading objects fully. As an example, when the filter criteria eliminates a large fraction of the objects, it may be faster to read the small number of objects that meet the criteria instead of the segments that are unreferenced by objects that meet the filter criteria. In a specific embodiment, a heuristic is provided that can choose between the two types of searches based on this property.

As another example, in cases where the storage system is relatively small or there is a relatively low deduplication ratio, it may be more efficient to perform a search across the logical objects or files in which a segment may be read multiple times based on a number of times it is referenced (e.g., logical search) as compared to performing a search as shown in the flows of FIGS. 4 and 7-9. In a specific embodiment, there can be a determination module to help determine, dynamically, a type of search to perform based on a threshold deduplication ratio. The deduplication ratio may be compared to the threshold deduplication ratio. If the deduplication ratio is below the threshold, a logical search may be performed. If the deduplication ratio is above the threshold, a search as shown, for example, in FIG. 4 may be performed.

A controller-worker architecture, as shown in the example of FIG. 6, may be applied to conduct a logical search. For example, in another specific embodiment, the controller manages the workers in conducting a logical search. In other words, the entire logical dataset (the form before deduplication) is read and fast string-matching algorithms are applied. In this specific embodiment, microservices may be used to read logical objects (or files) in parallel and perform string matching on each object to achieve parallelization gains.

In this specific embodiment, the controller accesses the data storage system to identify a set of objects having references to one or more segments. The controller generates a set of tasks involving searching each of the logical objects for a search term. The controller pushes or places the tasks onto the message queue for the workers to retrieve and process. In this specific embodiment, there can be a first task that includes reading a first object by progressing from the logical level to the actual data unit or segment that the first object references to determine whether or not the segment includes the search term. There can likewise be a second task that includes reading a second object by again progressing from the logical level to the actual data unit or segment that the second object references to determine whether or not the segment includes the search term.

Since the same segment may be referred by both the first and second objects, the same segment may be read multiple times such as during the processing of the first task by a first worker and during the processing of the second task by a second worker. As discussed, however, depending on factors such as the deduplication ratio, estimated time required to conduct the search at the deduplicated data level (i.e., on post-deduplicated data), estimated time required to conduct the search at the logical level, other factors, or combinations of these a logical search may be advantageous. In a specific embodiment, a method may include calculating a first estimated running time required to conduct a search at the logical level, calculating a second estimated running time required to conduct the search at the deduplicated data level, comparing the first and second estimated running times, selecting the search at the logical level when the first estimated running time is less than the second estimated running time, and selecting the search at the deduplicated data level when the second estimated running time is less than the first estimated running time.

Nonetheless, regardless of whether the search is conducted across the logical level or at the deduplicated data level, there can be multiple workers processing tasks in parallel. The controller can likewise monitor a depth of the message or task queue and allocate (or deallocate) workers as-needed in order to complete the search within a certain time or cost.

As discussed, in a specific embodiment, systems and techniques for conducting a search are implemented in an object storage system. It should be appreciated, however, that in other embodiments, such systems and techniques may be implemented within a file system, block-level storage system, or other storage architecture. For example, in various specific embodiments, data storage system 620 may include a file system or data storage system 620 may include a block storage system. In other specific embodiment, the slice recipes (or equivalent data structures) may include physical block addresses that reference locations in storage where fixed sized blocks are stored. There may or may not be compression regions. The controller-worker design shown in FIG. 6 remains applicable.

Referring back now to FIG. 1, the clients may be computing devices. The computing devices may be, for example, mobile phones, tablet computers, laptop computers, desktop computers, or servers. Further examples of clients include clients that are running in the cloud, such as on a virtual machine or in a container running in a public and/or private cloud environment. The clients may be other types of computing devices.

One or more services may be executed within a node. A node may be a container or virtual machine running on a host hardware platform. A host may host any number of containers, virtual machines, or both. In an embodiment, a host refers to a physical or virtual machine that can run one or more nodes or containers as part of the microservices including the search microservices. The term client may refer to a customer or a customer's computer resources outside of the microservices that communicate with the microservices. A further discussion of microservices, deduplication, controller and worker nodes microservice architecture, task queues, and data and metadata structures is provided in U.S. patent application Ser. No. 15/887,599, filed Feb. 2, 2018, now U.S. Pat. No. 10,509,675, issued Dec. 17, 2019, which is incorporated by reference along with all other references cited.

The host may be a general purpose computer including physical hardware and software. The physical hardware may include a processor, memory, storage (e.g., hard disk, flash storage), network interface, input/output (I/O) controller, and the like, each of which may be interconnected by a bus architecture of the host system. The host includes virtualization software such as a hypervisor or container manager.

Hypervisors and container managers provide an abstraction of the underlying hardware to the virtual compute environments and help to ensure isolation of the hosted virtual environments.

Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on a "host" hardware platform. A computer running the hypervisor is a host machine and all virtual machines are guest machines running guest operating systems (OS). In other words, the host may include a hardware platform, host operating system, and hypervisor supporting multiple virtual machines that have their own guest operating systems and guest applications.

Likewise, containers also provide for isolated environments and applications. In a container system, however, the underlying operating system provides the basic services to all of the containerized applications using virtual-memory support for isolation; whereas with hypervisors and VMs, the VMs have their own operating system using hardware VM support. That is, applications running in a container environment share an underlying operating system, while VMs can run different operating systems. One example of a container platform is Docker as provided by Docker, Inc. of San Francisco, California. Containers typically have a lower overhead than VMs. VMs, however, can provide a higher level of isolation. In a specific embodiment, multiple containers are run within a VM. In another specific embodiment, there can be separate VMs.

Figure 15:
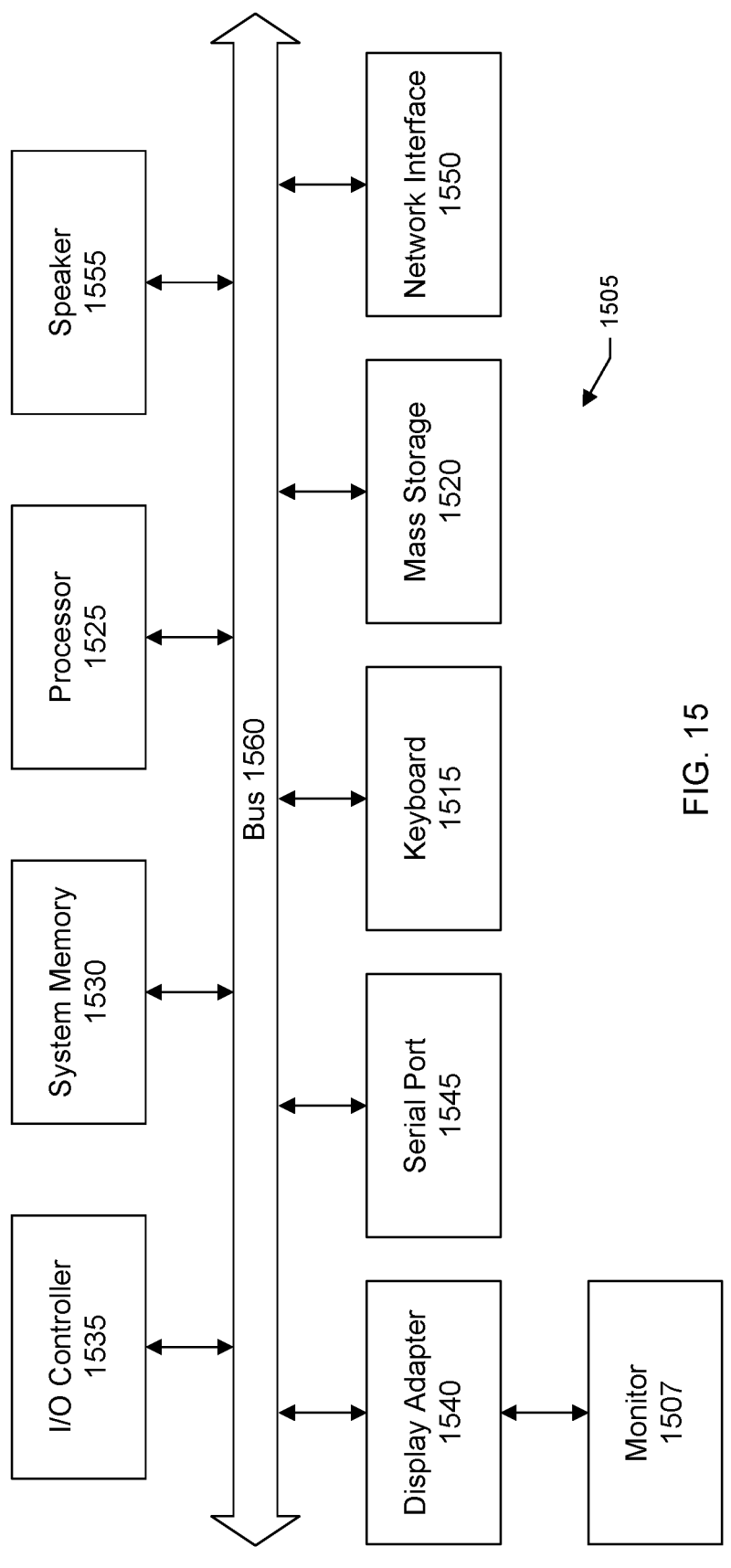
FIG. 15 shows a block diagram of a computer system suitable for use with the system in accordance with one or more embodiments.

FIG. 15 shows a system block diagram of a computer system 1505 used to execute the software of the present system described herein. The computer system includes a monitor 1507, keyboard 1515, and mass storage devices 1520. Computer system 1505 further includes subsystems such as central processor 1525, system memory 1530, input/output (I/O) controller 1535, display adapter 1540, serial or universal serial bus (USB) port 1545, network interface 1550, and speaker 1555. The system may also be used with computer systems with additional or fewer subsystems. For example, a computer system could include more than one processor 1525 (i.e., a multiprocessor system) or a system may include a cache memory.

Arrows such as 1560 represent the system bus architecture of computer system 1505. However, these arrows are illustrative of any interconnection scheme serving to link the subsystems. For example, speaker 1555 could be connected to the other subsystems through a port or have an internal direct connection to central processor 1525. The processor may include multiple processors or a multicore processor, which may permit parallel processing of information. Computer system 1505 shown in FIG. 15 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, there is a method comprising: receiving, at a deduplicated storage system, a search query comprising a search term, the deduplicated storage system storing data segmented into a plurality of segments, wherein fingerprints of the segments are generated referencing the segments, and metadata is maintained to allow reconstruction of the segmented data, the metadata comprising fingerprint listings indicating sequences according to which the segments should be reconstructed for an object; reading the plurality of segments to determine whether a segment includes at least a portion of the search term; identifying a full match when all of the search term is found in the segment; recording full matches in a results table, each record of a full match comprising a fingerprint of the segment in which the full match was identified; reading a first fingerprint listing associated with a first object; querying the results table for fingerprints in the first fingerprint listing to determine whether the first object references any matches in the results table; receiving from the results table a full match of the search term; and identifying the first object as having the search term.

The method may further include applying filter settings received with the search query to the metadata to obtain a subset of fingerprint listings to be read, the first fingerprint listing that is read thereby being a fingerprint listing of the first object that has meet the filter settings. The search term may include at least one of a string or a byte sequence.

The method may further include: identifying a partial match when a beginning portion of the search term is found at an end of the segment or when an ending portion of the search term is found at a start of the segment; recording partial matches in the results table, each record of a partial match comprising a fingerprint of the segment in which the partial match was identified; reading a second fingerprint listing associated with a second object; querying the results table for fingerprints in the second fingerprint listing to determine whether the second object references any matches in the results table; receiving from the results table a first partial match of the search term, the first partial match comprising a first fingerprint of a segment in which the first partial match was found; and querying the results table for a second fingerprint, next to the first fingerprint, in the second fingerprint listing to determine whether the results table comprises a second partial match of the search term that combines with the first partial match.

The method may further include: identifying a partial match when a beginning portion of the search term is found at an end of the segment or when an ending portion of the search term is found at a start of the segment; recording partial matches in the results table, each record of a partial match comprising a fingerprint of the segment in which the partial match was identified; combining the partial matches in the results table to form full matches, each record of a full match formed from combining the partial matches comprising a first fingerprint at which one of the beginning or ending portion of the search term was found, and a second fingerprint at which another of the beginning or ending portion of the search term was found; reading a second fingerprint listing associated with a second object; and querying the results table for fingerprints in the second fingerprint listing to determine whether the second object references any matches in the results table.

The method may further include: identifying a partial match when a beginning portion of the search term is found at an end of the segment, an ending portion of the search term is found at a start of the segment, or a middle portion of the search term is found extending across the segment; recording partial matches in the results table, each record of a partial match comprising a fingerprint of the segment in which the partial match was identified; reading a second fingerprint listing associated with a second object; querying the results table for fingerprints in the second fingerprint listing to determine whether the second object references any matches in the results table; receiving from the results table a first partial match of the search term, the first partial match comprising a first fingerprint of a segment in which the first partial match was found; querying the results table for a second fingerprint, next to the first fingerprint, in the second fingerprint listing to determine whether the results table comprises a second partial match of the search term that combines with the first partial match; receiving from the results table the second partial match; and querying the results table for a third fingerprint, next to the second fingerprint, in the second fingerprint listing to determine whether the results table comprises a third partial match of the search term that combines with the first and second partial matches.

The method may further include: recording in the results table an offset in the segment at which the search term is found; during the reading a first fingerprint listing associated with the first object, maintaining a running total of segment sizes for segments having fingerprints in the first fingerprint listing that are being read; and upon identifying the first object as having the search term, adding the offset in the segment at which the search term was found with the running total of segment sizes to report a position within the first object at which the search term was found.

The method may further include: receiving, at the deduplicated storage system, a second search query comprising a second search term; and dynamically determining whether to execute the second search query by performing a search across deduplicated segments of the deduplicated storage system or by performing a search across logical objects of the deduplicated storage system, wherein the dynamically determining comprises examining a deduplication ratio of the deduplicated storage system, a first estimated running time required to perform the search across the deduplicated segments, and a second estimated running time required to perform the search across the logical objects, and wherein the search across the logical objects includes when two or more logical objects reference a same segment, reading the same segment a first time when a first logical object of the two or more logical objects is searched, and reading the same segment a second time when a second logical object of the two or more logical objects is searched.

The method may further include: identifying a partial match when a beginning portion of the search term is found at an end of the segment or when an ending portion of the search term is found at a start of the segment; recording partial matches in the results table, each record of a partial match comprising a fingerprint of the segment in which the partial match was identified; and dynamically selecting one of combining the partial matches in the results table to form full matches or not combining the partial matches in the results table to form full matches.

The deduplicated storage system may store the segments as uncompressed individual segments, compressed individual segments, groups of uncompressed segments, or groups of compressed segments.

In another specific embodiment, there is a method comprising: providing a controller to manage searching a storage system; receiving a search query comprising a search term; generating, by the controller, a plurality of tasks associated with conducting a search of the storage system for any objects in the storage system having the search term; pushing the tasks onto a message queue; and allocating a plurality of workers to retrieve and process the plurality of tasks on the message queue, wherein a worker processes a task in parallel with another worker processing another task.

In a specific embodiment, the objects comprise logical objects having references to data units in the storage system and the method further comprises: receiving filter criteria with the search query; and before generating the plurality of tasks, filtering out logical objects that do not meet the filter criteria.

In a specific embodiment, the objects comprise logical objects having references to data units in the storage system, and the task of the worker comprises reading a logical object and data units referenced by the logical object to determine whether the search term can be found in the data units referenced by the logical object. The method may further include: dynamically adjusting a number of the plurality of workers based on a desired time to complete the search.

The method may further include: receiving status updates from the workers about the tasks being processed; logging the status updates in persistent storage; after an interruption of the search, restarting the search by accessing the persistent storage to determine which tasks were completed before the interruption; and pushing, onto the message queue, tasks that were not completed before the interruption and not pushing tasks onto the message queue that were completed before the interruption.

The method may further included: splitting an object to be searched into a plurality of pieces; generating a first task associated with conducting a search of a first piece of the object; generating a second task associated with conducting a search of a second piece of the object, wherein the first task is processed by a first worker while the second task is being processed by a second worker.

In a specific embodiment, the storage system comprises a deduplicated storage system storing data segmented into a plurality of segments, fingerprints of the segments are generated referencing the segments, and metadata is maintained to allow reconstruction of the segmented data, the metadata comprising fingerprint listings indicating sequences according to which the segments should be reconstructed for the objects, and the method further comprises: establishing a first phase of the search for the search term comprising: generating, by the controller, a first plurality of tasks comprising reading the plurality of segments to determine whether at least a portion of the search term is matched in a segment, and recording matches of at least portions of the search term in a database; pushing, by the controller, the first plurality of tasks onto the message queue for retrieval and processing by the plurality of workers; and establishing a second phase of the search comprising: applying, by the controller, filter settings received with the search query to the metadata to obtain a subset of fingerprint listings to be read; generating, by the controller, a second plurality of tasks comprising reading the subset of fingerprint listings and querying the database for fingerprints in the subset of fingerprint listings to determine whether an object associated with a fingerprint listing of the subset of fingerprint listings references a match recorded in the database; and pushing, by the controller, the second plurality of tasks onto the message queue for retrieval and processing by the plurality of workers.

In a specific embodiment, there is a method comprising: receiving, at a deduplicated storage system, a search query comprising a search term, the deduplicated storage system storing data segmented into a plurality of segments, wherein fingerprints of the segments are generated referencing the segments, and metadata is maintained to allow reconstruction of the segmented data, the metadata comprising fingerprint listings indicating sequences according to which the segments should be reconstructed; identifying a partial match when a beginning portion of the search term is found at an end of a segment or when an ending portion of the search term is found at a start of the segment; recording partial matches in a results table; reading a fingerprint listing; determining that a first fingerprint in the fingerprint listing has been recorded in the results table; upon the determination, checking whether a second fingerprint, next to the first fingerprint, in the fingerprint listing has been recorded in the results table; and if the second fingerprint has been recorded in the results table, determining a match of the search term has been found, a first portion of the search term having been found in a first segment corresponding to the first fingerprint and a second portion of the search term having been found in a second segment corresponding to the second fingerprint.

The search term may include at least one of a string or a byte sequence.

The method may further include: identifying a full match when the search term is found in a single segment; and recording full matches in the results table.

The method may further include: placing, by a controller, a plurality of tasks involving reading the plurality of segments onto a queue for retrieval by a plurality of workers, wherein a worker upon retrieving a task reads a particular segment corresponding to the task to determine no match of the search term, a full match of the search term, or the partial match of the search term, and wherein the particular segment is read at most a single time when processing the search query.

The method may include establishing a first phase of a search for the search term comprising: generating, by the controller, a first plurality of tasks comprising reading the plurality of segments to determine each of the search term being fully matched in a particular segment, partially matched in the particular segment, or not matched in the particular segment, and recording the matches in the results table; and placing, by the controller, the first plurality of tasks onto a queue for retrieval by a plurality of workers; and establishing a second phase of the search comprising: applying, by the controller, filter settings, received with the search query, to the metadata to obtain a subset of fingerprint listings to be read; generating, by the controller, a second plurality of tasks comprising reading the subset of fingerprint listings and querying the results table for fingerprints in the subset of fingerprint listings to determine whether an object associated with a fingerprint listing in the subset of fingerprint listings references a match in the results table; and placing, by the controller, the second plurality of tasks onto the queue for retrieval by the plurality of workers.

The method may further include: returning a result responsive to the search query, the result comprising identifications of data in which the search term was found and offsets in the data at which the search term is located.

In a specific embodiment, the search query comprises filter settings and the method further includes: applying the filter settings to the metadata to obtain a subset of fingerprint listings to be read.

In another specific embodiment, there is a system comprising: a processor, and memory configured to store one or more sequences of instructions which, when executed by the processor, cause the processor to carry out the steps of: receiving, at a deduplicated storage system, a search query comprising a search term, the deduplicated storage system storing data segmented into a plurality of segments, wherein fingerprints of the segments are generated referencing the segments, and metadata is maintained to allow reconstruction of the segmented data, the metadata comprising fingerprint listings indicating sequences according to which the segments should be reconstructed; identifying a partial match when a beginning portion of the search term is found at an end of a segment or when an ending portion of the search term is found at a start of the segment; recording partial matches in a results table; reading a fingerprint listing; determining that a first fingerprint in the fingerprint listing has been recorded in the results table; upon the determination, checking whether a second fingerprint, next to the first fingerprint, in the fingerprint listing has been recorded in the results table; and if the second fingerprint has been recorded in the results table, determining a match of the search term has been found, a first portion of the search term having been found in a first segment corresponding to the first fingerprint and a second portion of the search term having been found in a second segment corresponding to the second fingerprint.

In another specific embodiment, there is a computer program product comprising a non-transitory computer-readable medium having a computer-readable program code embodied therein, the computer-readable program code adapted to be executed by one or more processors to implement a method comprising: receiving, at a deduplicated storage system, a search query comprising a search term, the deduplicated storage system storing data segmented into a plurality of segments, wherein fingerprints of the segments are generated referencing the segments, and metadata is maintained to allow reconstruction of the segmented data, the metadata comprising fingerprint listings indicating sequences according to which the segments should be reconstructed; identifying a partial match when a beginning portion of the search term is found at an end of a segment or when an ending portion of the search term is found at a start of the segment; recording partial matches in a results table; reading a fingerprint listing; determining that a first fingerprint in the fingerprint listing has been recorded in the results table; upon the determination, checking whether a second fingerprint, next to the first fingerprint, in the fingerprint listing has been recorded in the results table; and if the second fingerprint has been recorded in the results table, determining a match of the search term has been found, a first portion of the search term having been found in a first segment corresponding to the first fingerprint and a second portion of the search term having been found in a second segment corresponding to the second fingerprint.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
receiving, at a deduplicated storage system storing objects, a query comprising a search term, the deduplicated storage system comprising metadata, and a plurality of segments into which the objects have been split and deduplicated based on fingerprints of the segments, and the metadata comprising sequences of fingerprints according to which the segments should be assembled to reconstruct the objects;
finding a partial match when a prefix of the search term is found at an end of a segment or a suffix of the search term is found at a beginning of the segment;
recording partial matches;
merging the partial matches to form full matches;
recording in a database the full matches formed from the partial matches, each full match comprising a first fingerprint of a first segment in which the prefix was found, and a second fingerprint of a second segment in which the suffix was found;
checking whether a fingerprint and a next fingerprint from a first sequence of fingerprints associated with a first object have been recorded in the database; and
when the fingerprint and the next fingerprint have been recorded, reporting the first object as having the search term.

2. The method of claim 1 wherein the recording partial matches comprises:
recording a fingerprint of the segment within which the prefix of the search term was found.

3. The method of claim 1 wherein the recording partial matches comprises:
recording a fingerprint of the segment within which the suffix of the search term was found.

4. The method of claim 1 further comprising:
ignoring a particular segment when a partial match of the search term is found in a middle of the particular segment.

5. The method of claim 1 further comprising:
finding a full match when an entire portion of the search term is found in a particular segment; and
recording a position within the particular segment at which the search term was found.

6. The method of claim 1 wherein the merging the partial matches to form full matches comprises:

for each prefix match, querying the database to determine if there is a suffix that joins with the prefix to complete the search term.

7. A system comprising: a processor, and memory storing one or more sequences of instructions which, when executed by the processor, cause the processor to carry out the steps of:
receiving, at a deduplicated storage system storing objects, a query comprising a search term, the deduplicated storage system comprising metadata, and a plurality of segments into which the objects have been split and deduplicated based on fingerprints of the segments, and the metadata comprising sequences of fingerprints according to which the segments should be assembled to reconstruct the objects;
finding a partial match when a prefix of the search term is found at an end of a segment or a suffix of the search term is found at a beginning of the segment;
recording partial matches;
merging the partial matches to form full matches;
recording in a database the full matches formed from the partial matches, each full match comprising a first fingerprint of a first segment in which the prefix was found, and a second fingerprint of a second segment in which the suffix was found;
checking whether a fingerprint and a next fingerprint from a first sequence of fingerprints associated with a first object have been recorded in the database; and
when the fingerprint and the next fingerprint have been recorded, reporting the first object as having the search term.

8. The system of claim 7 wherein the recording partial matches comprises:
recording a fingerprint of the segment within which the prefix of the search term was found.

9. The system of claim 7 wherein the recording partial matches comprises:
recording a fingerprint of the segment within which the suffix of the search term was found.

10. The system of claim 7 wherein the processor further carries out the step of:
ignoring a particular segment when a partial match of the search term is found in a middle of the particular segment.

11. The system of claim 7 wherein the processor further carries out the steps of:
finding a full match when an entire portion of the search term is found in a particular segment; and
recording a position within the particular segment at which the search term was found.

12. The system of claim 7 wherein the merging the partial matches to form full matches comprises:
for each prefix match, querying the database to determine if there is a suffix that joins with the prefix to complete the search term.

13. A computer program product comprising a non-transitory computer-readable medium having a computer-readable program code embodied therein, the computer-readable program code adapted to be executed by one or more processors to implement a method comprising:
receiving, at a deduplicated storage system storing objects, a query comprising a search term, the deduplicated storage system comprising metadata, and a plurality of segments into which the objects have been split and deduplicated based on fingerprints of the segments, and the metadata comprising sequences of fingerprints according to which the segments should be assembled to reconstruct the objects;

finding a partial match when a prefix of the search term is found at an end of a segment or a suffix of the search term is found at a beginning of the segment;

recording partial matches;

merging the partial matches to form full matches;

recording in a database the full matches formed from the partial matches, each full match comprising a first fingerprint of a first segment in which the prefix was found, and a second fingerprint of a second segment in which the suffix was found;

checking whether a fingerprint and a next fingerprint from a first sequence of fingerprints associated with a first object have been recorded in the database; and when the fingerprint and the next fingerprint have been recorded, reporting the first object as having the search term.

14. The computer program product of claim 13 wherein the recording partial matches comprises:

recording a fingerprint of the segment within which the prefix of the search term was found.

15. The computer program product of claim 13 wherein the recording partial matches comprises:

recording a fingerprint of the segment within which the suffix of the search term was found.

16. The computer program product of claim 13 wherein the method further comprises:

ignoring a particular segment when a partial match of the search term is found in a middle of the particular segment.

17. The computer program product of claim 13 wherein the method further comprises:

finding a full match when an entire portion of the search term is found in a particular segment; and recording a position within the particular segment at which the search term was found.

18. The computer program product of claim 13 wherein the merging the partial matches to form full matches comprises:

for each prefix match, querying the database to determine if there is a suffix that joins with the prefix to complete the search term.

* * * * *